United States Patent [19]
Luick

[11] Patent Number: 5,805,850
[45] Date of Patent: Sep. 8, 1998

[54] VERY LONG INSTRUCTION WORD (VLIW) COMPUTER HAVING EFFICIENT INSTRUCTION CODE FORMAT

[75] Inventor: David Arnold Luick, Rochester, Minn.

[73] Assignee: International Business Machines Corporation, Armonk, N.Y.

[21] Appl. No.: 790,839

[22] Filed: Jan. 30, 1997

[51] Int. Cl.[6] .................................................. G06F 9/30
[52] U.S. Cl. ........................................................ 395/391
[58] Field of Search ....................... 364/DIG. 1 MS File, 364/DIG. 2 MS File; 395/376, 381, 384, 385, 386, 389, 390, 391

[56] References Cited

U.S. PATENT DOCUMENTS

| | | | |
|---|---|---|---|
| 4,236,206 | 11/1980 | Strucker et al. ......................... | 364/200 |
| 4,506,325 | 3/1985 | Bennett et al. .......................... | 364/200 |
| 4,766,566 | 8/1988 | Chuang .................................... | 364/900 |
| 5,057,837 | 10/1991 | Colwell et al. ........................... | 341/55 |
| 5,179,680 | 1/1993 | Colwell et al. ........................... | 395/425 |
| 5,197,135 | 3/1993 | Eickemeyer et al. .................... | 395/375 |
| 5,333,280 | 7/1994 | Ishikawa et al. ......................... | 395/375 |
| 5,371,864 | 12/1994 | Chuang .................................... | 395/375 |
| 5,404,469 | 4/1995 | Chung et al. ............................. | 395/375 |
| 5,408,658 | 4/1995 | Rechtschaffen et al. ................ | 395/650 |
| 5,412,784 | 5/1995 | Rechtschaffen et al. ................ | 395/375 |
| 5,442,760 | 8/1995 | Rustad et al. ............................ | 395/375 |

OTHER PUBLICATIONS

K. Ebcioglu, "Some Design Ideas for a VLIW Architecture for Sequential–Natured Software," in Parallel Processing (Proceedings of IFIP WG 10.3 Working Conf. on Parallel Procesing). M. Cosnard et al., pp. 1–21, North Holland, 1988.

"A VLIW Architecture for a Trace Scheduling Center," Robert P. Colwell et al., 1987 ACM, pp. 180–192.

"Very Long Instruction Word Architectures and the ELI–512," Joseph A. Fisher, 1983 ACM pp. 140–150.

"VLIW Machines: Multiprocessings We Can Actually Program," Joseph A. Fisher et al., 1984 IEEE, pp. 299–305.

"An Architectural Framework for Supporting Heterogeneous Instruction–Set Architectures," Gabriel M. Silberman et al., 1993 IEEE, Jun. 1993, pp. 39–56.

*Primary Examiner*—Robert B. Harrell
*Attorney, Agent, or Firm*—Roy W. Truelson

[57] ABSTRACT

A CPU of a computer system utilizing a VLIW architecture comprises an instruction register, an instruction sequencing unit, a bank of data registers, a set of arithmetic/logic units (ALUs), and instruction decode logic. The bit positions in the instruction register correspond to a set of parcels or fields, each parcel corresponding to a different respective one of the ALUs. The operation, if any, performed by each ALU during a machine cycle is specified by the parcel corresponding to the ALU. Each parcel of an instruction may contain such information as an operation code (op code), source and destination registers, special registers, immediate data, storage addresses, etc. In order to reduce the total number of bits required to store an instruction, at least some of the bit positions required to specify such information to the instruction decode logic are implied by the position of the parcel within the instruction word. Preferably, multiple-way conditional branches may be specified in each instruction word. A variable number of conditional branches may be specified by using some of the parcels which would otherwise be available to specify operations in the ALUs.

15 Claims, 17 Drawing Sheets

FIG. 3

| RR0 | RR1 | RR2 | RR3 | RR4 | RR5 | RR6 | RR7 | RS0 | RS1 | RS2 | RS3 | RS4 | RS5 | RS6 | RS7 |
|---|---|---|---|---|---|---|---|---|---|---|---|---|---|---|---|
| 310 | 311 | 312 | 313 | 314 | 315 | 316 | 317 | 318 | 319 | 320 | 321 | 322 | 323 | 324 | 325 |

201

PRIMARY OP CODE TABLE

|     | 000 | 001 | 010 | 011 | 100 | 101 | 110 | 111 | |
|-----|-----|-----|-----|-----|-----|-----|-----|-----|---|
| 000 | --  | RNM | RINM | RIMI | ROTA | ROTB | SHF | LOG EXT | RR OPS Only |
| 001 | Add | Sub | Sub F | AE | CMP | CMPL | EIU | ARITH EXT | |
| 010 | Add Immediate | | | | | | | | |
| 011 | OR Immediate | | | Subtract Immediate | | | | | |
| 100 | XOR Immediate | | | AND Immediate | | | | | |
| 101 | LLR | LCTR | LSP | -- | STLR | STCTR | STSP | STFL | RS OPS & Some RR OPS |
| 110 | LBZ | LHZ | LHA | LWZ | LWA | LD | LFS | LFL | |
| 111 | STB | STH | STHX | STW | STWX | STD | STFS | EXT | |

MULL Immediate (row 100, subtract immediate row)

FIG. 4

| #BC | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | RR0 | RR1 | RR2 | RR3 | RR4 | RR5 | RR6 | RR7 | RS0 | RS1 | RS2 | RS3 | RS4 | RS5 | RS6 | RS7 |
| 1 | MSK | BC0 | RR2 | RR3 | RR4 | RR5 | RR6 | RR7 | RS0 | RS1 | RS2 | RS3 | RS4 | RS5 | RS6 | RS7 |
| 2 | MSK | BC0 | BC1 | RR3 | RR4 | RR5 | RR6 | RR7 | RS0 | RS1 | RS2 | RS3 | RS4 | RS5 | RS6 | RS7 |
| 3 | MSK | BC0 | BC1 | BC2 | RR4 | RR5 | RR6 | RR7 | RS0 | RS1 | RS2 | RS3 | RS4 | RS5 | RS6 | RS7 |
| 4 | MSK | BC0 | BC1 | BC2 | BC3 | RR5 | RR6 | RR7 | RS0 | RS1 | RS2 | RS3 | RS4 | RS5 | RS6 | RS7 |
| 5 | MSK | BC0 | BC1 | BC2 | BC3 | BC4 | RR6 | RR7 | RS0 | RS1 | RS2 | RS3 | RS4 | RS5 | RS6 | RS7 |
| 6 | MSK | BC0 | BC1 | BC2 | BC3 | BC4 | BC5 | RR7 | RS0 | RS1 | RS2 | RS3 | RS4 | RS5 | RS6 | RS7 |
| 7 | MSK | BC0 | BC1 | BC2 | BC3 | BC4 | BC5 | BC6 | RS0 | RS1 | RS2 | RS3 | RS4 | RS5 | RS6 | RS7 |
| 8 | MSK | BC0 | BC1 | BC2 | BC3 | BC4 | BC5 | BC6 | BC7 | RS1 | RS2 | RS3 | RS4 | RS5 | RS6 | RS7 |

FIG. 6

| | RR0 | | RR1 | | RR2 | | RR3 |
|---|---|---|---|---|---|---|---|
| 0 | | 0 | | 0 | | 0 | |

701
| L | | 0 | | 0 | | 0 | |
|---|---|---|---|---|---|---|---|

No Branch Conditions

702
| L | 00 | 0 | | 0 | | 1 | |
|---|---|---|---|---|---|---|---|

One Branch Condition

703
| L | | 0 | | 1 | | | |
|---|---|---|---|---|---|---|---|

Two Branch Conditions

704
| L | | 1 | | 0 | | | |
|---|---|---|---|---|---|---|---|

Three Branch Conditions

705
| L | | 1 | | 1 | | | |
|---|---|---|---|---|---|---|---|

Four Branch Conditions

706
| L | 1x | 0 | | 0 | | 1 | |
|---|---|---|---|---|---|---|---|

Five Branch Conditions

707
| L | 0100 | 0 | | 0 | | 1 | |
|---|---|---|---|---|---|---|---|

Six Branch Conditions

708
| L | 0101 | 0 | | 0 | | 1 | |
|---|---|---|---|---|---|---|---|

Seven Branch Conditions

709
| L | 0110 | 0 | | 0 | | 1 | |
|---|---|---|---|---|---|---|---|

Eight Branch Conditions

FIG. 7

901
| BC1 TEM | SEQ TEM |

1 Branch Condition (14 bits/mask)   28-Bit TEM Field

902
| BC1 TEM | BC2 TEM | SEQ TEM |

2 Branch Conditions (13 bits/mask)   39-Bit TEM Field

903
| BC1 TEM | BC2 TEM | BC3 TEM | SEQ TEM |

3 Branch Conditions (12 bits/mask)   48-Bit TEM Field

904
| BC1 TEM | BC2 TEM | BC3 TEM | BC4 TEM | SEQ TEM |

4 Branch Conditions (11 bits/mask)   55-Bit TEM Field

905
| BC1 TEM | BC2 TEM | BC3 TEM | BC4 TEM | BC5 TEM | SEQ TEM |

5 Branch Conditions (10 bits/mask)   60-Bit TEM Field

906
| BC1 TEM | BC2 TEM | BC3 TEM | BC4 TEM | BC5 TEM | BC6 TEM | SEQ TEM |

6 Branch Conditions (9 bits/mask)   63-Bit TEM Field

907
| BC1 TEM | BC2 TEM | BC3 TEM | BC4 TEM | BC5 TEM | BC6 TEM | BC7 TEM | SEQ TEM |

7 Branch Conditions (8 bits/mask)   64-Bit TEM Field

908
| 1 TEM | 2 TEM | 3 TEM | 4 TEM | 5 TEM | 6 TEM | 7 TEM | 8 TEM | S TEM |

8 Branch Conditions (7 bits/mask)   63-Bit TEM Field

FIG. 9A

```
       0                                              31
310 ┌─┬─────────┬─┬────────────────────────────────┐
    │L│ADDR [7] │1│       TEM [23 bits]            │
    └─┴─────────┴─┴────────────────────────────────┘
311 ┌─┬──────────────────────────────┬─────────────┐
    │0│       BC1   [24 bits]        │   TEM [7]   │
    └─┴──────────────────────────────┴─────────────┘
312 ┌─┬──────────────────────────────┬─────────────┐
    │0│       BC2   [24 bits]        │   TEM [7]   │
    └─┴──────────────────────────────┴─────────────┘
313 ┌─┬──────────────────────────────┬─────────────┐
    │1│       BC3   [24 bits]        │   TEM [7]   │
    └─┴──────────────────────────────┴─────────────┘
314 ┌─┬──────────────────────────────┬─────────────┐
    │T│       BC4   [24 bits]        │   TEM [7]   │
    └─┴──────────────────────────────┴─────────────┘
315 ┌─┬──────────────────────────────┬─────────────┐
    │T│       BC5   [24 bits]        │   TEM [7]   │
    └─┴──────────────────────────────┴─────────────┘
```

FIG. 10E

```
       0                                              31
310 ┌─┬─────────┬────┬────────────────────────────┐
    │L│ADDR [7] │0100│     TEM [20 bits]          │
    └─┴─────────┴────┴────────────────────────────┘
311 ┌─┬──────────────────────────────┬─────────────┐
    │0│       BC1   [24 bits]        │   TEM [7]   │
    └─┴──────────────────────────────┴─────────────┘
312 ┌─┬──────────────────────────────┬─────────────┐
    │0│       BC2   [24 bits]        │   TEM [7]   │
    └─┴──────────────────────────────┴─────────────┘
313 ┌─┬──────────────────────────────┬─────────────┐
    │1│       BC3   [24 bits]        │   TEM [7]   │
    └─┴──────────────────────────────┴─────────────┘
314 ┌─┬──────────────────────────────┬─────────────┐
    │T│       BC4   [24 bits]        │   TEM [7]   │
    └─┴──────────────────────────────┴─────────────┘
315 ┌─┬──────────────────────────────┬─────────────┐
    │T│       BC5   [24 bits]        │   TEM [7]   │
    └─┴──────────────────────────────┴─────────────┘
316 ┌─┬──────────────────────────────┬─────────┬───┐
    │T│       BC6   [24 bits]        │ TEM [5] │// │
    └─┴──────────────────────────────┴─────────┴───┘
```

FIG. 10F

VERY LONG INSTRUCTION WORD (VLIW) COMPUTER HAVING EFFICIENT INSTRUCTION CODE FORMAT

FIELD OF THE INVENTION

The present invention relates to digital computer systems, and in particular to a machine-level instruction format for use in a computer processor which processes multiple operations in parallel.

BACKGROUND OF THE INVENTION

A modem computer system typically comprises a central processing unit (CPU), and other supporting hardware such as system memory, communications busses, input/output controllers, storage devices, etc. The CPU is the heart of the system. It executes the instructions which comprise a computer program and directs the operation of the other system components.

From the standpoint of the computer's hardware, all systems, from the earliest to the most modem, operate in fundamentally the same manner. Processors are capable of performing a limited set of very simple operations, such as arithmetic, logical comparisons, and movement of data from one location to another. But each operation is performed very quickly. The programs which direct the machine to perform massive numbers of these very simple operations give the illusion that the machine is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase the clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of the circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is still possible to improve system speed by using multiple processors. The modest cost of individual processors packaged on integrated circuit chips has made this practical. It is now nearly universal, for example, to use slave processors to perform various tasks within a computer system, such as input/output device communications and control. Typically, such slave processors execute a single special-purpose program repeatedly. The use of such slave processors considerably improves system speed, by off-loading work from the CPU to the slave. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously.

It is much more difficult, however, to improve the speed at which a single task, such as an application program, executes. The problem with multiple CPUs is the coordination of function. For slave I/O processors and, this is not so difficult because function is pre-defined and limited. It is much more difficult to coordinate function among multiple CPUs executing general purpose application programs, the details of which the system designers don't know in advance. Most application programs follow a single path or flow of steps performed by the processor. While it is sometimes possible to break up this single path into multiple parallel paths, there is no known algorithmic approach of universal application for doing so. Generally, this must be done on a case-by-case basis, and in a non-automated manner. Such a time-consuming approach to programming is not justified for a vast array of application programs.

Thus, while multiple processors improve overall system performance, there are still many reasons to improve the speed of the individual CPU. If the CPU clock speed is given, it is possible to further increase the speed of the CPU (i.e., the number of operations executed per second) by increasing the average number of operations executed per clock cycle.

Various processor hardware design techniques have been used to increase the average number of operations executed per clock cycle. These have involved, for example, the use of pipelines, multiple execution units with look ahead hardware for finding instructions to execute in parallel, etc. Limited improvement is possible using these techniques, but the hardware support required is often massive.

Another approach is a hybrid in which a single CPU has characteristics of both a uniprocessor and a parallel machine. In this approach, a single instruction register and instruction sequence unit execute programs under a single flow of control, but multiple arithmetic/logic units (ALUs) within the CPU can perform multiple primitive operations simultaneously. Rather than hardware for determining all the simultaneous operations to be performed at execution time, a compiler determines this before execution and formats the instructions in such a way to specify the parallel operations. Because the instruction word held in the instruction register must specify multiple independent operations to be performed by the different ALUs, it is anticipated that this approach will typically employ a very long instruction word, and it is commonly known as a very long instruction word (VLIW) architecture.

Several academic papers have suggested that a VLIW architecture can in many applications achieve greater parallelism and greater speed than multiple independent processors operating in parallel. The theory underlying VLIW is that the typical application program has a single flow of control, but many of the primitive operations within that flow can be performed in parallel. Therefore an automated compiler for a VLIW machine does not have to alter program flow (something which has been almost impossible to automate in parallel processor machines). It only has to determine which primitive operations can be performed in parallel. While even this is a difficult task in practice, it should lend itself to automation much more readily than the altering of program flow.

Although there has been some research and experimentation concerning VLIW architectures, such machines have yet to gain widespread commercial acceptance. The VLIW architectural concept is still in its early stages of evolution. A number of problems must be overcome before such machines can effectively compete commercially with more evolved older designs.

One such problem is the size and format of the instruction word. The expected size of the instruction word imposes significant burdens on the supporting hardware, such as memory, instruction cache, buses, etc. VLIW designs anticipate a large instruction word for several reasons. First, each of the ALUs requires its own command, which can include an operation code, source and destination designations, etc. Second, there must be a conditional branching mechanism appropriate to the VLIW architecture. Because many simple operations are being performed with each instruction, the effectiveness of a VLIW machine would be limited if only one conditional branch were allowed in a given instruction, as is usually the case in a conventional machine. Therefore it is desirable to permit conditional branching to multiple destinations from a single VLIW instruction, a characteristic referred to as N-way branching. Of course, all of the branch conditions and destinations must in some way be specified in the instruction. Third, because a theoretically pure VLIW design employs a large pool of data registers, and other special registers, any of which can be assigned arbitrarily as source or destination for the various operations, the number of bits in the instruction required for identifying each source and destination register is greater than for a conventional design employing a smaller number of registers.

It is desirable to reduce the size of the instruction word, and the attendant complexity and cost of the processor, while at the same time maintaining sufficient flexibility of function to realize the advantages of the VLIW architecture.

SUMMARY OF THE INVENTION

It is therefore an object of the present invention to provide an enhanced processing method and apparatus for a computer system.

Another object of this invention is to increase the performance of a computer system.

Another object of this invention is to enhance the ability of a computer system processor to perform multiple simultaneous operations.

Another object of this invention is to more efficiently encode instructions used in a very long instruction word (VLIW) processor of a computer system.

Another object of this invention is to reduce the amount of memory required for storing instructions in a computer system having a very long instruction word (VLIW) processor.

Another object of this invention is to reduce the complexity of a very long instruction word (VLIW) processor of a computer system.

Another object of this invention is to reduce the cost of a very long instruction word (VLIW) processor of a computer system.

A central processing unit (CPU) of a computer system utilizing a VLIW architecture comprises an instruction register, an instruction sequencing unit, a bank of data registers, a set of arithmetic/logic units (ALUs), and instruction decode logic. The instruction register holds machine-level instructions for execution by the CPU. The bit positions in the instruction register correspond to a set of parcels or fields, each parcel corresponding to a different respective one of the ALUs. The operation, if any, performed by each ALU during a machine cycle is specified by the parcel corresponding to the ALU.

Each parcel of an instruction in the instruction register may contain such information as an operation code (op code), source and destination registers, special registers such as condition code registers, immediate data, storage addresses, etc. In order to reduce the total number of bits required to store an instruction, at least some of the bit positions required to specify such information to the instruction decode logic are implied by the position of the parcel within the instruction word.

Preferably, multiple-way conditional branches may be specified in each instruction word. Conditional branches are specified in the instruction by using some of the parcels which would otherwise be available to specify operations in the ALUs. Each parcel specifies a single conditional branch. Logically, these conditional branches are evaluated serially, so that a branch is taken only if the conditions specified therein are met and all preceding branches are not taken. The number of conditional branches specified (and hence the number of parcels used for this purpose) may vary from instruction to instruction, and an instruction may specify no conditional branches at all.

In order to reduce the number of bits required for specifying branch destinations, it is preferred that a single destination address for conditional branches be specified in the instruction register, regardless of the number of such branches. The destinations are computed as offsets of the single specified destination address. The value of the offsets may be specified in short (e.g. 3-bit) fields, or may be implied by the ordinal position of the branch.

In the preferred embodiment, the instruction register is 512 bits in length, and contains 16 parcels of 32 bits each, each parcel corresponding to a different ALU. The parcel positions in the instruction register are divided into two groups of 8 parcels each, the first group being capable of specifying only a limited set of operations. Generally, the operations capable of specification in the first group involve registers only as source and destination, and the first group of parcel positions are accordingly designated "RR" (register-to-register) parcels. The second group, which is also capable of specifying transfers to and from storage, are designated "RS" (register-to-storage) parcels.

In the preferred embodiment, up to 8 conditional branches may be specified in each instruction word. When specifying conditional branches, one parcel is required for certain mask information, and one parcel for each conditional branch. The total number of parcels required for branching is N+1, where N is the number of conditional branches to be specified. When specifying conditional branches, RR parcels are used first, and a single RS parcel is used only in the case where 8 conditional branches are specified.

BRIEF DESCRIPTION OF THE DRAWINGS

FIG. 3 is a diagram of the instruction register showing pre-defined parcel fields, according to the preferred embodiment.

FIG. 4 is a table illustrating the allocation of primary op-codes for use in parcels, according to the preferred embodiment.

FIG. 6 depicts the usage of the various instruction register parcels under differing numbers of branch conditions, according to the preferred embodiment.

FIG. 7 depicts the usage of certain bit positions imbedded in the first three parcels of the instruction register to specify the number of branch conditions, according to the preferred embodiment.

FIGS. 9A and 9B depict the target enable mask fields required to specify differing numbers of conditional branches in the instruction, according to the preferred embodiment.

FIGS. 10A, 10B, 10C, 10D, 10E, 10F, 10G and 10H summarize the placement of address fields, branch condition fields and target enable masks within instruction parcels, under differing numbers of branch conditions, according to the preferred embodiment.

DETAILED DESCRIPTION OF THE PREFERRED EMBODIMENT

Hardware Overview

Figure 1:
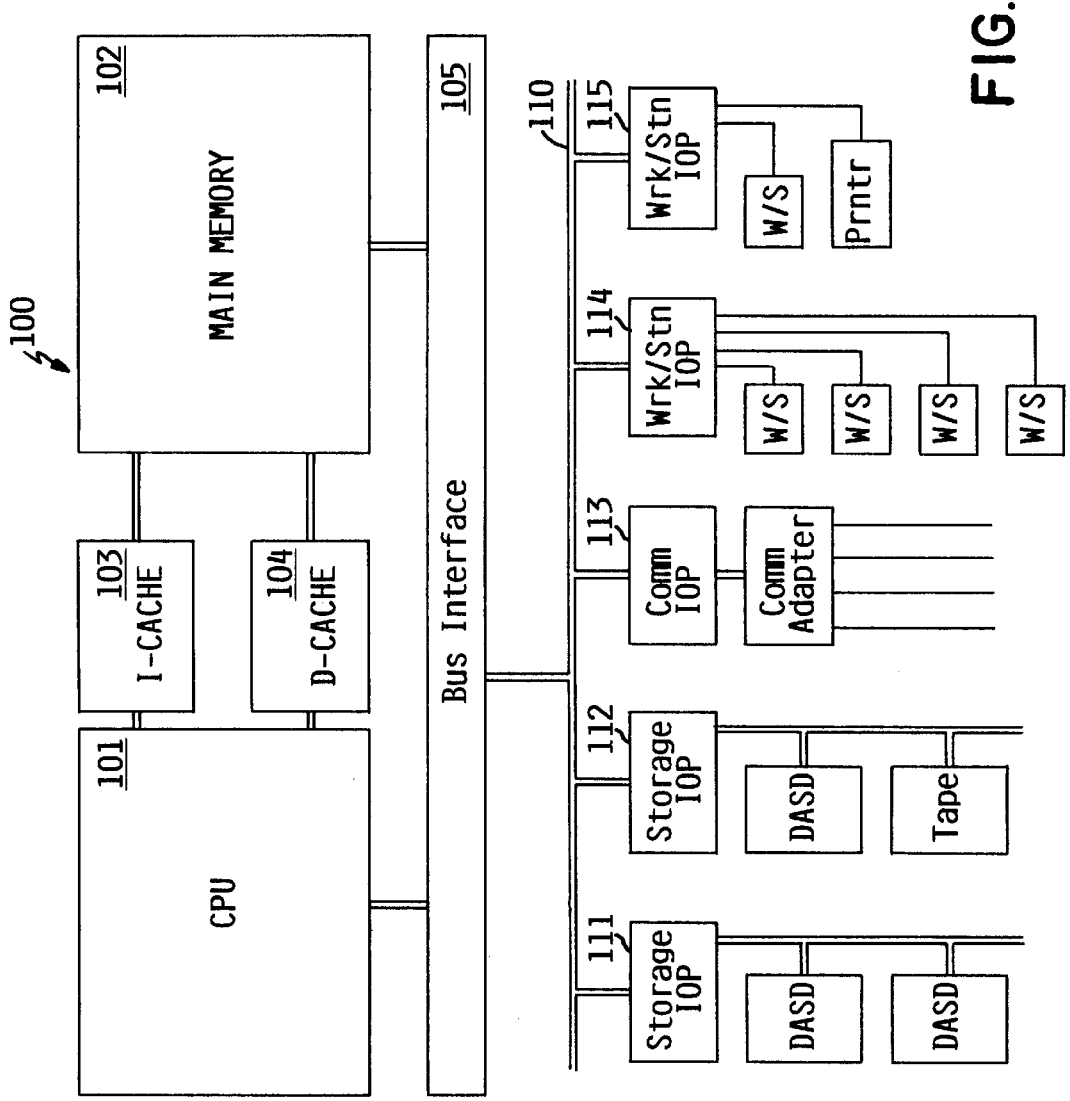
FIG. 1 is a high level diagram of the major hardware components of a computer system according to the preferred embodiment.

The major hardware components of the a computer system 100 for utilizing a VLIW processor architecture according to the preferred embodiment of the present invention are shown in FIG. 1. CPU 101 for processing instructions is coupled to separate caches 103 and 104. Instruction cache (I-cache) 103 stores instructions for execution by CPU 101. Data cache (D-cache) 104 stores data to be used by CPU 101. Both caches communicate with random access main memory 102. CPU 101 and main memory 102 also communicate via bus interface 105 with system bus 110. Various I/O processing units (IOPs) 111–115 attach to system bus 110 and support communication with a variety of storage and I/O devices, such as direct access storage devices (DASD), tape drives, workstations, printers, and remote communication lines. It should be understood that FIG. 1 is intended to depict the representative major components of a system 100 at a high level, and that the number and types of such components may vary.

Figure 2:
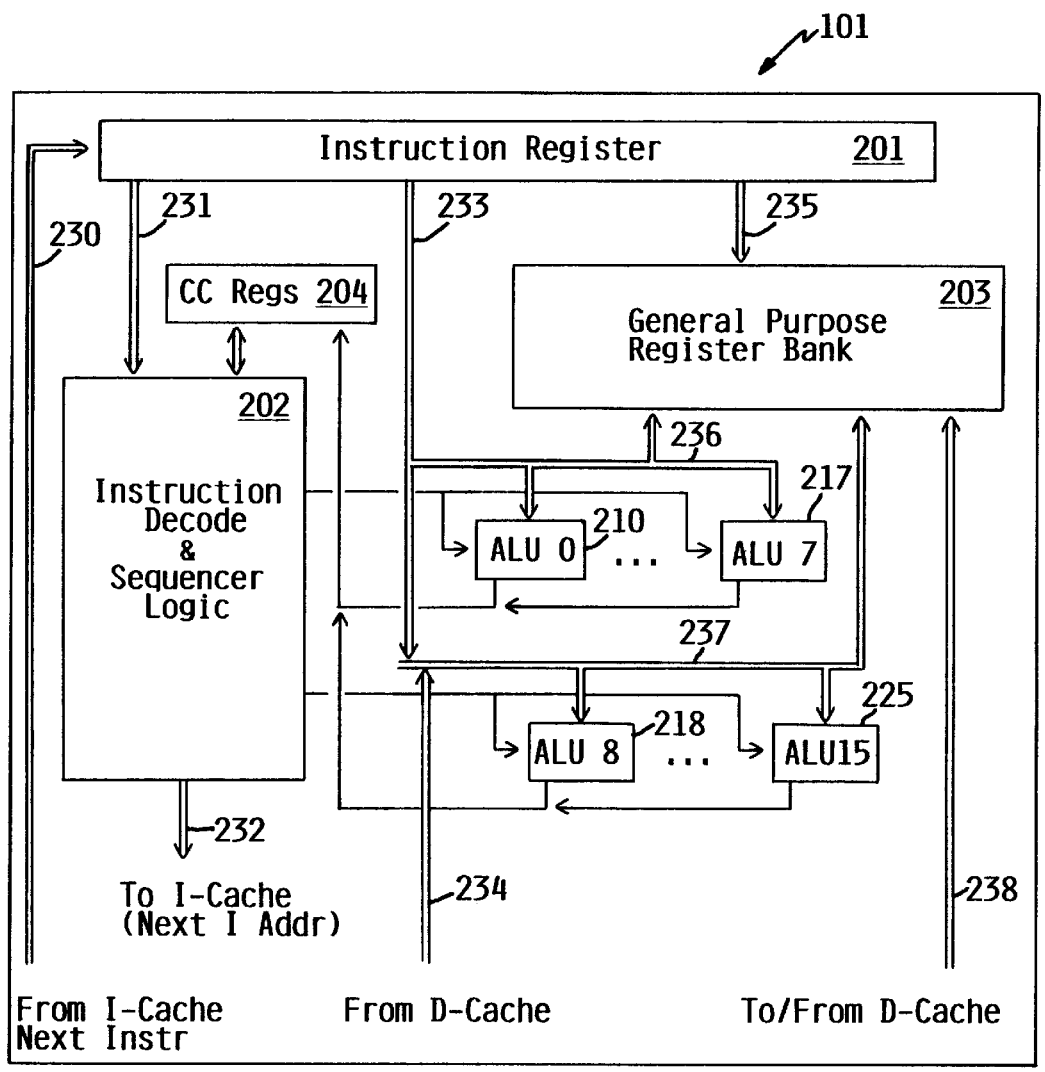
FIG. 2 is a high level diagram of the central processing unit of a computer system according to the preferred embodiment.

FIG. 2 is a high level diagram of the major components of CPU 101, according to the preferred embodiment. Instruction register 201 is used to hold the current instruction being executed by the CPU. Instruction decode and sequencer logic 202 decodes the instruction in register 201 to determine the operations to be performed, and determines the address of the next instruction to execute. General purpose data register bank 203 is a bank of 64 general purpose data registers for holding data to be used in performing operations. Arithmetic/logic units (ALUs) 210–225 are separate ALUs capable of performing separate operations, from separate operands, with each instruction cycle. Condition code registers 204 are a set of registers for holding condition codes which are the result of operations performed by ALUs 210–225, and which can be used for conditional branch decisions.

ALUs 210–217 communicate with data registers 203 via data paths represented as 236, 237. As represented, source operand data from registers 203 may flow into any of ALUs 210–217, and target operand data (i.e., the results of an operation) may flow from any of the ALUs to the data registers.

In the preferred embodiment, ALUs 218–225 are each capable of performing any operation defined in the set of operation codes for ALUs, including operations involving operands from storage. In practice, operands from storage are retrieved from data cache 103, and for this reason a data path 234 is shown from the D-cache to ALUs 218-225. Additionally, operations performed by ALUs 218–225 may include immediate data contained in the instruction register itself, as represented by data path 233.

ALUs 210–217 are capable only of a subset of the operations which can be performed by ALUs 218–225. In general, the operations which can be performed by ALUs 210–217 use only registers 203 for the operands, as represented by the more restricted scope of data path 236. For this reason, the subset of operations performed by ALUs 210–217 are referred to as "register-register" ("RR") operations, and ALUs 210–217 are also called the "RR" ALUs. ALUs 218–225, which can in addition use operands from storage ("register-storage", or "RS" operations), are also called the "RS" ALUs.

By limiting the set of operations which can be performed by ALUs 210–217, the corresponding supporting hardware such as busses, gates, etc. can be significantly reduced. While this may be expected to impact performance because only eight RS operations can be performed during a single instruction execution cycle, in fact this is not necessarily true. If fewer than half of the ALU operations designated in a single instruction are RS operations, all these operations can be assigned to the RS registers, without any impact on performance. It is expected that normally RR operations will predominate, and therefore the impact on performance will be very small. Additionally, as explained more fully below, some of the RR parcels will frequently be used to specify branch conditions, so that on the average more than half of the parcels available for specifying ALU operations will be RS parcels, which can be used to specify any operation. Finally, limiting the set of operations in the RR parcels facilitates certain bit manipulations which are useful in the sharing of parcels between branch specification and ALU operations.

It is additionally possible to perform direct loads and stores of data between registers and data cache 103 as represented by data path 238, or to load immediate data from an instruction to a register as represented by data path 235.

Conditions resulting from ALU operations are stored in a bank of condition code registers 204. In the preferred embodiment, condition code register bank 204 comprises sixteen 4-bit registers, each of the sixteen registers holding the conditions associated with a single operation. Condition code registers 204 are designated CC0 through CC15. Each of the four bits in a condition code register is a flag which is set whenever a particular condition resulting from an operation is true. The four conditions are: (1) the result is negative (less than); (2) the result is positive (greater than); (3) the result is zero (equal); and (4) the result has produced an overflow.

Condition code information held in registers 204 is used by decode and sequencer logic 202 to determine whether conditional branches are to be taken, as described more fully herein.

In addition to the hardware shown in the simplified diagram of FIG. 2, CPU 101 contains a bank of 64 floating point registers and 64 control registers. The condition code register is one of the control registers. Some of the instructions in the instruction set access these registers. While the principles of operation are described below for the general purpose registers, it should be understood that the floating point registers are associated with instruction parcels in the same manner as the general purpose registers.

It should be understood that the various data paths within CPU 101 have been represented in FIG. 2 in greatly simplified form for clarity. In reality, many separate data paths into and out of the various components are required to support simultaneous data flow to and from multiple ALUs, registers, cache locations, etc. Additionally, many data and control lines have been omitted entirely from FIG. 2 for clarity.

Preferably, I-cache 103 is the same width as instruction register 201 and contains uncompressed instructions in the same format that is used in instruction register 201. This facilitates high-speed loading of instructions from I-cache 103 into instruction register 201. While I-cache 103 and D-cache 104 are each represented as single monolithic entities in FIG. 1, it will be understood by those skilled in the art that these may in fact be implemented as multiple caches, which could be of differing sizes, levels, response times, etc.

Instruction register 201 is shown in greater detail in FIG. 3. In the preferred embodiment, register 201 is logically divided into sixteen equally sized parcels 310–325, each parcel holding 32 bits of information. Each parcel 310–325 corresponds to a respective ALU 210–225. I.e., parcel 310 labelled RR0 corresponds to ALU 210, parcel 311 corresponds to ALU 211, etc. Each parcel is capable of storing a primitive operation for execution by the ALU corresponding to the parcel. The contents of an individual parcel are sometimes referred to as a "primitive instruction" or "primitive", and should be distinguished from an "instruction", which is the contents of the entire 512-bit register 201. As explained previously, ALUs 210–217 are capable only of a restricted set of operations. Accordingly, the corresponding parcels 310–317 are used for storing RR operations, and are designated parcels RR0 through RR7. ALUs 218 through 225 are capable of the full set of operations, and the corresponding parcels 318–325 are accordingly designated parcels RS0 through RS7, respectively.

ALU Operation Specification Format

As noted above, each parcel 310–325 in instruction register 201 can store a primitive ALU operation instruction. Each operation contains an operation code and other necessary information. Depending on the type of operation specified by the op code, the primitive ALU operation may designate a target register for a result, one or more source registers for data input to the ALU, memory locations for loading and storing data (which may be specified as direct or indirect addresses), condition code registers affected, immediate data for input to the ALU, etc.

In accordance with the preferred embodiment, in at least some of the primitive operation formats, certain registers are designated for use in the operation. The specification of the appropriate register requires a concatenation of at least one bit taken from the parcel, and at least one bit which is implied by the position of the parcel within instruction register 201. This concept is called "parcel affinity".

In particular, in most operations a target register field in the parcel designating one of the sixty-four general-purpose registers contains five bits. As six bits are required to specify one of sixty-four objects, the five bits in the parcel are concatenated with a single bit derived from the parcel's position (even or odd) in instruction register 201 to create a 6-bit designation of the target register. The five bits in the parcel constitute the higher order 5 bits of the target register designation, with the position being the lowest order bit. Thus, for example, a target register field in parcel 316 containing '01101' would be concatenated with '0' (the parcel RR6 being even) to produce a target register designation of '011010', or 26. If however, the identical primitive operation were contained in parcel 315, the target register field would be concatenated with '1' (parcel RR5 being odd) to produce a target register designation of '011011', or 27. The same principle is used in designating a target floating point register for those special instructions which specify a target floating point register.

Although this method of designating the target register reduces the generality of the system, it is believed that this does not cause any significant reduction in ultimate system performance. Each parcel can still designate any of thirty-two general purpose registers as a target, which should be an adequate number. Furthermore, any register in the entire register bank 203 can be used as a source, so where successive instructions perform complex operations on data, it shouldn't matter where target data is stored. Finally, if it is necessary to store a target in a particular register, the primitive operation which does so can always be placed in an appropriately numbered (even or odd) parcel.

A similar technique is used in some instructions to designate a condition register from condition register bank 204. In many instructions, where insufficient bits exist to designate a condition register, the target register is implied entirely by the position of the parcel, i.e., a respective one of the sixteen condition registers is associated with each respective parcel, and this is the default condition register for storing the condition results of the specified ALU operation. However, because only eight of the sixteen condition registers can be used to specify branch conditions, it is sometimes desirable to be able to designate a condition register in the primitive operation contained in the parcel. Therefore, certain ALU operation formats contain a limited field (less than the full four bits) for designating the condition code register. For example, a 1-bit field can be used to specify the first bit of the condition code destination register, i.e., whether the register is one of 0 through 7, or one of 8 through 15. The full designation of the register is then formed by concatenating the 1-bit field with the last three bits of the ordinal number of the parcel. For example, if an instruction in parcel 310 (ordinal number '0000') contains a 1-bit condition code register designation of '1', the condition register used as the target is '1000' (decimal 8), but if the 1-bit field contains a '0', the condition register is '0000'. In this manner, it is possible to specify whether or not the target condition register will be one which can control a branch on the next instruction. The same principle can be applied to supply an extra bit when there are only three available bit positions in the instruction for specifying one of the sixteen condition code registers.

FIG. 4 is a table showing diagrammatically the assignment of bits to primary op codes of a primitive instruction, according to the preferred embodiment. In this embodiment, the primary op code is 6 bits in length. These op codes specify the operations to be performed by each parcel. Each row of FIG. 4 represents a set of primary op codes having the same three higher order bits, while each column represents a set of op codes having the same three lower order bits. For example, the compare instruction ("CMP") in the second row, fifth column, has a primary op code of '001100'. The op code set of the preferred embodiment is based loosely on the PowerPC architecture, it being understood that this op code set is used only by way of example, and many other op code sets could be used.

Some of the instructions, specifically those having the "RI" format as explained more fully below (e.g., Add Immediate), use only the first four bits of the primary op code field for operation code; the remaining two bits being used for storing immediate data. Additionally, because the 6 bits of primary op code are not sufficient to specify all desired operations, many instructions have an additional operation code extender field, allowing the specification of additional operations.

The primary op code is always assigned to the first six bit positions of each parcel (i.e., positions 0-5). However, in the case of certain register-to-register parcels 310-317, by design only operations in the upper half of the table of FIG. 4 can be specified these parcels and performed by the corresponding hardware. Because the first bit of these op codes is always 0, it is not necessary to use this first bit position in the register-to-register parcels for specifying an op code. Therefore, bit position 0 of these parcels is not used for designating operations, but used for other purposes as described more fully herein.

The primary operation codes shown above are considered insufficient to designate all desirable operations in an operation code set. Therefore, certain operations require an operation code extender field to more specifically designate the operation to be performed. In addition, it is sometimes desirable to include more information in an operation than is possible to specify in a 32-bit parcel. In certain cases, it is possible to pair two parcels together to specify a single ALU operation, the additional parcel being considered an "extend immediate upper parcel" ("EIU parcel"). The use of such EIU parcels is described in commonly assigned copending patent application Ser. No. 08/764/004 by David A. Luick and Philip B. Winterfield, filed Dec. 12, 1996, entitled "VLIW Architecture and Method for Expanding a Parcel", which is herein incorporated by reference.

Figure 5:
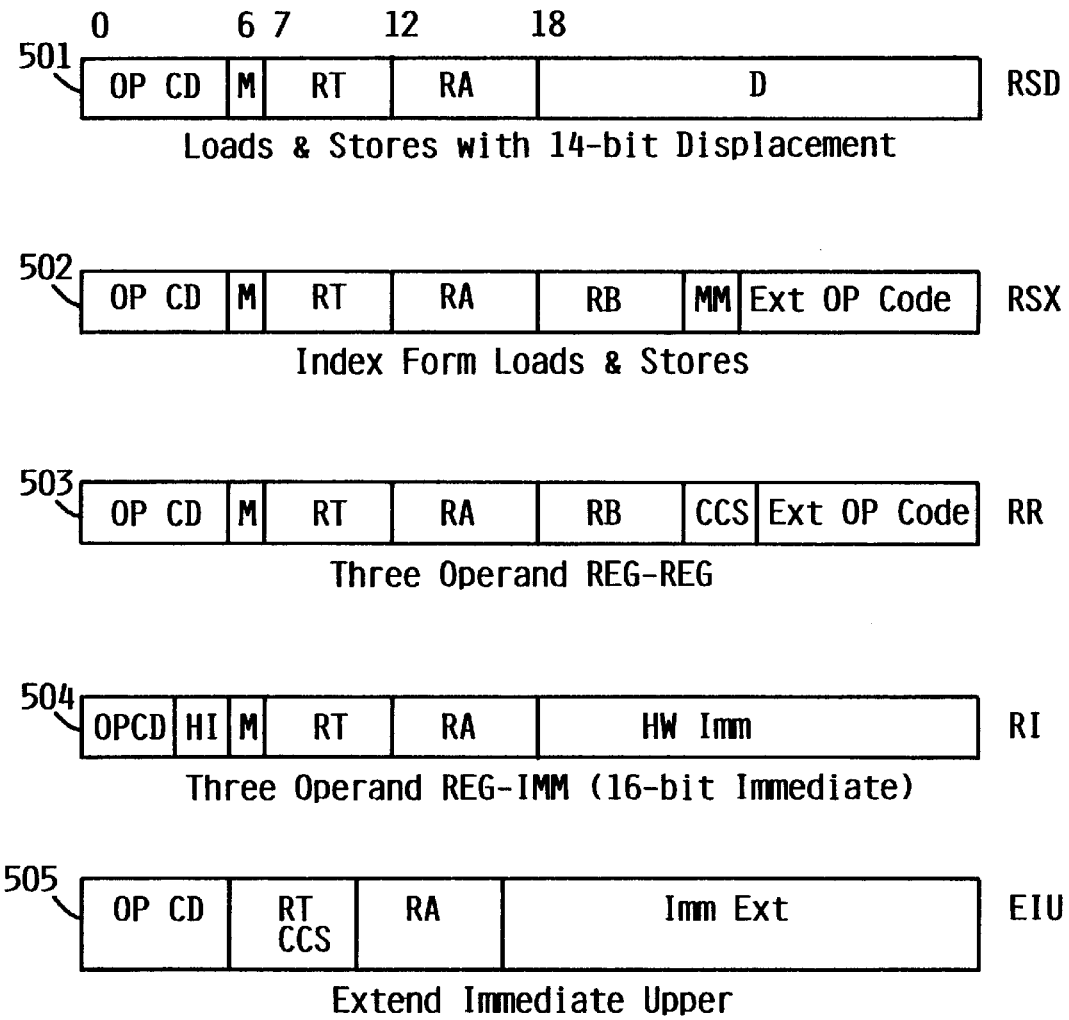
FIG. 5 shows various parcel formats for specifying a primitive instruction within a parcel, according to the preferred embodiment.

FIG. 5 shows various parcel formats for specifying a primitive instruction within a parcel, according to the preferred embodiment. Five example formats 501–505 are shown, it being understood that other formats are possible. As shown, in instruction formats 501–503 and 505, bit positions 0-5 are assigned to the primary op code. In "RI" format 504, bit positions 0-3 are assigned to the primary op code, and positions 4-5 are used for immediate data.

Bit position 6 is usually (but not always) used as a mode bit ("M") for specifying an addressing mode. Bit positions 7-11 are usually used to designate a target register; only five bits are necessary, because the 6th bit of a target register identifier is implied from the position of the parcel. Bit positions 12-17 are usually used to designate a first source register (Register A).

The RSD format instruction 501 is used primarily for load and store type operations. The 14-bit "D" field designates a displacement used to compute an address in memory for loading and storing.

The RSX format instruction 502 and RR format 503 are similar. Both have an op code extender field ("Ext OP Code") which is used with the primary op code field to specify a particular operation. This is a 6-bit filed in the case of the RSX format 502, and a 5-bit field in the case of the RR format. The RR format specifies a condition code register (3-bit "CCS" field), while the RSX format has 2 additional mode bits. Both formats may specify a second source register (Register B).

The RI format 504 is to perform an operation on a source register (designated by RA) and a 16-bit immediate data field. The 16-bit immediate data field occupies bit positions 4-5 and 18-31.

The EIU format 505 is used only for certain instructions requiring two parcels for specification. A target register or a condition code register may be specified. The 16-bit Imm Ext field is used for further specification of the type of operation or for data.

The following table lists the primary operation codes shown in FIG. 4 along with the format associated with each type.

| Op Code | Operation | | Format |
|---------|-----------|---|--------|
| 000000 | — | Not Used | |
| 000001 | RNM | Rotate & Mask | RR' |
| 000010 | RINM | Rotate Imm & Mask | RR' |
| 000011 | RIMI | Rotate Imm & Insert under Mask | RR' |
| 000100 | ROTA | Rotate (Group A) | RR |
| 000101 | ROTB | Rotate (Group B) | RR |
| 000110 | SHF | Shift Group | RR |
| 000111 | LOG EXT | Logical Ops Group | RR |
| 001000 | ADD | Add Group | RR |
| 001001 | SUB | Subtract Group | RR |
| 001010 | SUB F | Subtract From Group | RR |
| 001011 | AE | Add Extend Group | RR |
| 001100 | CMP | Compare Group | RR |
| 001101 | CMPL | Compare Logical Group | RR |
| 001110 | EIU | EIU (2 parcel) Group | EIU |
| 001111 | ARITH | Arithmetic Extend Group | RR |
| 0100xx | AddImm | Add Immediate Data | RI |
| 0101xx | SubImm | Subtract Immediate Data | RI |
| 0110xx | OR Imm | Logical OR Immediate Data | RI |
| 0111xx | AND Imm | Logical AND Immediate Data | RI |
| 1000xx | XOR Imm | Logical Excl-OR Immediate Data | RI |
| 1001xx | MUL Imm | Multiply Immediate Data | RI |
| 101000 | LLR | Load to Link Reg | RSD |
| 101001 | LCTR | Load to Count Reg | RSD |
| 101010 | LSP | Load Floating Point Reg | RSD |
| 101011 | — | Not Used | |
| 101100 | STLR | Store Link Reg | RSD |
| 101101 | STCTR | Store Count Reg | RSD |
| 101110 | STSP | Store Floating Point Reg | RSD |
| 101111 | STFL | Store Float Long | RSD |
| 110000 | LBZ | Load Byte and Zero | RSD |
| 110001 | LHZ | Load Half-Word and Zero | RSD |
| 110010 | LHA | Load Half-Word Algebraic | RSD |
| 110011 | LWZ | Load Word and Zero | RSD |
| 110100 | LWA | Load Word Algebraic | RSD |
| 110101 | LD | Load Double Word | RSD |
| 110110 | LFS | Load Float Short | RSD |
| 110111 | LFL | Load Float Long | RSD |
| 111000 | STB | Store Byte | RSD |
| 111001 | STH | Store Half-Word | RSD |
| 111010 | STHX | Store Half-Word X-Form | RSD |
| 111011 | STW | Store Word | RSD |
| 111100 | STWX | Store Word X-Form | RSD |
| 111101 | STD | Store Double Word | RSD |
| 111110 | STFS | Store Float Short | RSD |
| 111111 | EXT | RSX Group | RSX |

The format designated RR' is a slight modification of the RR format.

The designation of registers as described herein can be implemented in many ways, with many variations in parcel format including operation codes, size of fields, etc. Although certain details are disclosed, these should not be taken to limit the application of parcel affinity to particular parcel formats. In particular, multiple bit positions can be derived from a parcel position, and multiple bit positions (which may or may not be interleaved) from one or more fields in the ALU operation parcel.

Specifying Instruction Length and Multiple Branch Information

While the instruction register of the preferred embodiment holds 16 parcels, permitting up to 16 primitive operations to be performed simultaneously, it is recognized that frequently fewer than all 16 parcels can actually be used. It would be possible to have a fixed instruction size of 16 parcels in memory, specifying no-ops for all the unused parcels. In the preferred embodiment, a variable instruction length is permitted. An instruction may be either 8 parcels in length, or 16 parcels in length. The effect of this variable length is to significantly reduce the amount of code required in memory for storing a program, because the number of unused (no-op) parcels is greatly reduced. A single bit is required to specify whether an instruction is an 8-parcel instruction or a 16-parcel instruction. This length bit (designated "L" in FIGS. 7 and 10A–10H) is the first bit of the instruction. If the first bit of the instruction is set to 1, the hardware treats the instruction as an 8-parcel instruction. In this case, the instruction is loaded into parcels RR0-RR3 and RS0-RS3. These parcels are used for operations, and the remaining parcels are treated as no-ops. The description of branch conditions below is generally applicable to the 16-parcel instruction, it being understood that with minor modifications branches can be specified in a similar manner with an 8-parcel instruction.

In the preferred embodiment, parcels 310–318 can optionally be used to specify a variable number of branch conditions instead of ALU operations. Up to eight branch conditions can be specified (up to four conditions where an 8-parcel instruction is specified). When branch conditions are specified, a number of parcels equal to the number of branch conditions plus one is required for specifying the branch conditions; the remaining parcels are available to specify ALU operations.

Allowing parcels to be used for dual purposes achieves a significant reduction in the overall size of the instruction register required, when compared with instruction field having single fixed purposes. For example, if the instruction register was to specify up to eight branch conditions in a separate field, and up to sixteen ALU operations at the same time, an additional several hundred bits would be required to specify the branch conditions. It is true that such an instruction word would allow the processor to actually perform sixteen ALU operations concurrently with evaluating eight branch conditions, but these extremes are rare in actual operation. In the typical case, only a few branch conditions will be used, sometimes none at all. In fact, it will be common that for a given instruction, some of the sixteen parcels specify no operation at all. Therefore, in practice very little throughput will be lost as a result of sharing parcels between branches and ALU operations, as described herein.

FIG. 6 is a table depicting the usage of the various instruction register parcels 310–325 under differing numbers of branch conditions. Each column 610–625 in the table of FIG. 6 represents a single respective parcel 310–325, while each row 601–609 represents the usage of the parcels given zero through eight branch conditions, respectively.

For example, the first row 601 specifies parcel usage where there are no branches specified. In this case, all parcels specify ALU operations. Column 610 for parcel 310 specifies ALU operation RR0, a register-register operation performed by ALU-0 210. Column 619 for parcel 319 specifies ALU operation RS1, a register-storage operation performed by ALU-9 219.

The second row 602 specifies parcel usage where a single branch condition is specified. In this case, two parcels are required for specifying the branch information. As FIG. 6 shows, these parcels are parcels 310 and 311, represented by columns 610 and 611, respectively. The designation "MSK" in column 610 indicates that parcel 310 is used for certain mask information, as described more fully below, while the designation BCO in column 611 indicates that parcel 311 is used for the branch condition for branch 0, branches being numbered 0 through 7. Parcels 312–325, represented by columns 612–625, are used for RR and RS ALU operations.

One additional parcel is required for each additional branch, up to eight branches. Row 609 shows the parcel usage where eight branch conditions (BC0 through BC7) are specified. In this case, nine parcels 310–318 are used for branch information, while the remaining seven parcels 319–325 are available for specifying ALU operations.

It should be understood that FIG. 6 is a simplified conceptual diagram of parcel usage. In fact, where branch conditions are specified, the parcels allocated to branch information hold data which is formatted in a more complex manner, as described more fully below.

The capacity to specify multiple branches within a single instruction requires four types of information: (a) the number of branch conditions being specified; (b) the conditions on which branches are taken; (c) the destination addresses of the branches; and (d) the conditional execution of ALU instructions, specified by a "target enable mask" ("TEM").

Specifying the Number of Branch Conditions

Because parcels are just patterns of bits, the processor must be able to determine whether a particular parcel is to be interpreted as an ALU operation or branch information, i.e., the processor must be able to determine the number of branch conditions. In accordance with the preferred embodiment, there is no separate register or field which records this information; it is imbedded in the parcels themselves. FIG. 7 shows how this information is imbedded in the parcels.

In order to support imbedding this information in the parcels, the first six parcels 310–315 are further restricted to a subset of the RR instructions. I.e., parcels 316–317 can specify any RR operation but parcels 310–315 can specify only a limited subset of the RR operations. Parcels 310–315 can specify only the RR operations which have operation codes with '0' in the first bit position (bit position 0). To maximize the utility of the first three parcels, the operation codes for the ALUs are assigned so that all codes beginning with '0' are RR operations, and all RS operations begin with '1'. However, because there are a greater number of possible RR operations, some RR operations begin with '1', and these can not be specified by parcels 310–315 or performed by ALUs 210–215. Preferably, the most commonly performed RR operations are assigned codes beginning with '0', to maximize the utility of ALUs 210–215. For example, the Multiply Immediate Data operation, a rarely used RR operation, is assigned an op code beginning with '1'.

As shown in FIG. 7, the first bit position (position 0) of each of the second through fourth parcels 311–313 is used to specify the number of branch conditions. In some cases, additional bit positions in the first parcel 310 are also used. As explained above, parcels 310–315 may only specify ALU operations with op codes beginning in '0'. Therefore, if no branch conditions are specified, parcels 311–313 will specify ALU operations and all three first bit positions will be '0', as shown in case 701.

Case 702 shows the bit information which specifies that there is one branch condition. In this case, the first bit positions of the second through fourth parcels 311–313 contain '001'. An additional branch number extender field (NBEX) is imbedded at bit positions 8 and 9 of the first parcel 310. The NBEX field is needed because five cases use the same '001' pattern in the first bit positions of parcels 311–313.

Case 703 shows the bit information which specifies that there are two branch conditions. In this case, only the first bit positions of the second and third parcels 311,312 are used, and these contain '01'. The first bit position of the fourth parcel 313 is needed for the target enable mask, as explained below. Cases 704 and 705, for three and four branch conditions respectively, are similar. As shown in case 704, a value of '10' in the first bit positions of the parcels 311,312 specifies three branch conditions, while a value of '11' in these positions specifies four branch conditions.

Cases 706–709 show the bit patterns for five through eight branch conditions, respectively. In each case, as in the case of one branch condition, the first bit positions of the second through fourth parcels 311–313 contain the value '001'. Therefore the NBEX field is necessary to distinguish these cases. Case 706 uses a 1-bit NBEX field with a value of '1' at bit position 8 of the first parcel 310 (this is depicted in FIG. 7 as a 2-bit NBEX field with value '1x'; the second bit is used for the TEM field as shown in FIG. 10E). Cases 707–709 use a 4-bit NBEX field at bit positions 8–11 of the first parcel 310.

The assignment of bit positions imbedded in parcels as described to specify the number of branch conditions is necessary to reserve sufficient bits for other information, specifically the target enable mask, as described more fully below. While the assignment may appear confusing, it can be readily decoded by hardware implemented boolean logic. The following boolean expressions, which can be implemented in hardware as a single level of AND-OR gates, can evaluate whether a given instruction parcel specifies an ALU operation or branch information. Other control logic would decode the ALU operation or branch condition information, as appropriate. If the following evaluations are true, then parcel specified is an instruction; otherwise, it is a branch:

RR0: $\neg RR1_0 \wedge \neg RR2_0 \wedge \neg RR3_0$
RR1: $\neg RR1_0 \wedge \neg RR2_0 \wedge \neg RR3_0$
RR2: $\neg RR1_0 \wedge \neg RR2_0 \wedge \neg RR3_0 + \neg RR1_0 \wedge \neg RR2_0 \wedge \neg RR0_8 \wedge \neg RR0_9$
RR3: $\neg RR1_0 \wedge \neg RR3_0 + \neg RR1_0 \wedge \neg RR0_8 \wedge \neg RR0_9 + \neg RR1_0 \wedge RR2_0$
RR4: $\neg RR1_0 \wedge \neg RR3_0 + \neg RR1_0 \wedge \neg RR0_8 \wedge \neg RR0_9 + \neg RR1_0 \wedge RR2_0 + RR1_0 \wedge \neg RR2_0$
RR5: $\neg RR3_0 + \neg RR0_8 \wedge \neg RR0_9 + RR2_0 + RR1_0$
RR6: $\neg RR3_0 + \neg RR0_9 + RR2_0 + RR1_0 + RR0_8$
RR7: $\neg RR3_0 + \neg RR0_9 + RR2_0 + RR1_0 + RR0_8 + \neg RR0_{10} \wedge \neg RR0_{11}$
RS0: $\neg RR3_0 + \neg RR0_9 + RR2_0 + RR1_0 + RR0_8 + \neg RR0_{10}$ Where, e.g., $RR3_0$ represents the 0 bit of parcel RR3.

Specifying the Conditions on Which Branches are Taken

A separate 24-bit branch condition field is required to specify the conditions under which possible branches may be taken. Each parcel which contains branch information, starting with parcel 311, contains one of these 24-bit fields.

The 24-bit branch condition field is divided into eight 3-bit sub-fields, each sub-field corresponding to one of the condition code registers CC0 through CC7 in condition code register bank 204. Each 3-bit subfield specifies one of eight possible branch conditions: no condition (NIL), less than (LT), greater than (GT), equal (EQ), not equal (NE), greater than or equal (GE), less than or equal (LE), and overflow (OVR). The eight sub-fields are tested against the contents of the corresponding condition code registers CC0 through CC7, and the results are logically ANDed together to produce a single logical true or false output for the branch. The NIL condition indicates that the output of the test is true regardless of the contents of the corresponding condition code register. Thus, if all eight sub-fields contain NIL, an unconditional branch is specified. If all but one contain NIL, the branch is conditional only upon satisfaction of the one condition which is not NIL. If all but two contain NIL, both non-NIL conditions must be satisfied, and so on.

Because only one branch can actually be taken, branches are logically evaluated hierarchically, from left to right. The left-most branch condition which evaluates to true is taken, regardless of the results of evaluating the other branch conditions. Thus, branch condition 1, if true, is always taken. Branch condition n is taken only if all branch conditions less than n (to the left of n) evaluate to false. This prioritization can have a slight negative impact on cycle time. The hardware is constructed so that, if multiple conditions are simultaneously true, it will stall for a clock cycle to prioritize the conditions. Optimally, the compiler attempts to avoid multiple true conditions simultaneously.

Specifying the Destination Addresses of the Branches

Figure 8:
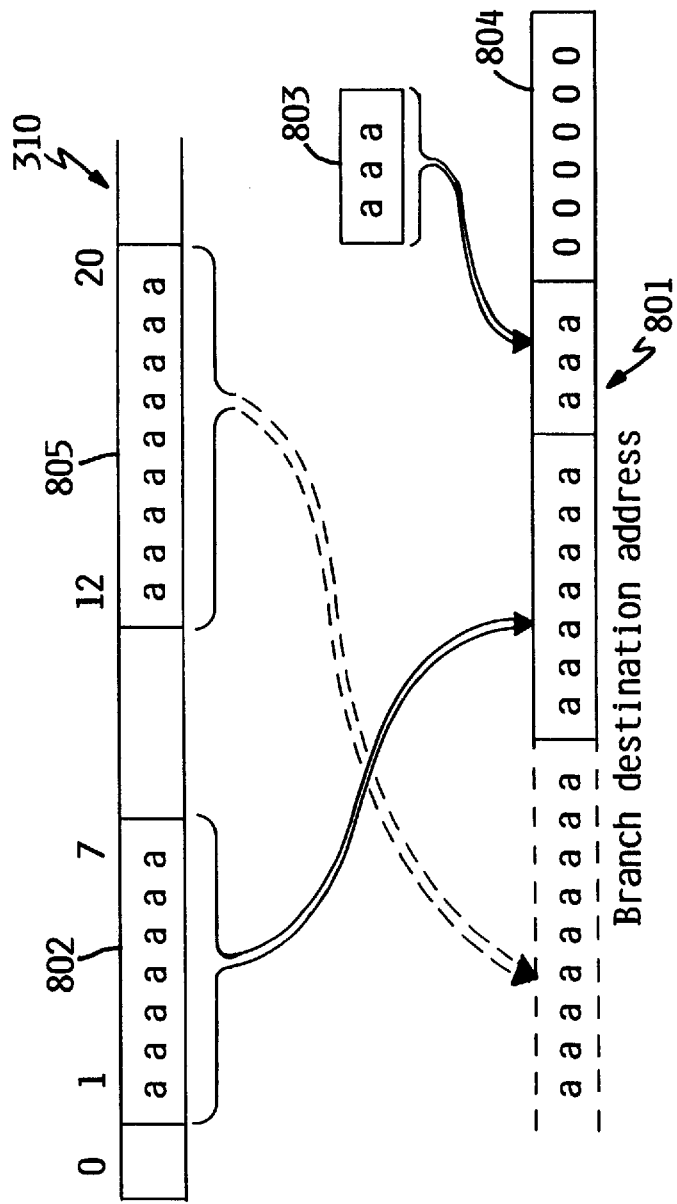
FIG. 8 depicts how a branch destination address for conditional branch is formed according to the preferred embodiment.

In the preferred embodiment, the instruction register contains only a single branch destination address, even where up to eight branches are specified. The various destination addresses are computed as offsets from the branch destination address specified by the instruction, as shown in FIG. 8.

A 16-bit branch destination address 801 is formed by concatenating a 7-bit address field 802 in parcel 310, a 3-bit offset field 803, representing the ordinal number of the branch condition, and a 6-bit field 804 of all zeroes, the latter representing the lowest six order bits in the destination address.

Two alternative implementations are available for derivation of the offset field value 803. Offset field 803 can either be the ordinal number of the branch condition, or specified in the branch condition. In the first alternative, the first branch condition takes the ordinal number '000' in field 803, the second branch condition takes '001', the third '010', and so on. Thus, no additional bits are required to specify the value of the offset field, but some flexibility is lost as the offsets are fixed in relation to each other. In the second alternative, the last three bits of the 24-bit branch condition field are used to specify the offset value, rather than specify the contents of condition code register 7 (CC7). This reduces the number of condition code registers which can effectively be used for branching, but increases the flexibility to order the branch conditions.

The 16-bit branch destination address represents an address within the currently executing 64-Kbyte segment. In order to form a complete virtual address in the address space of the processor (which is preferably a 64-bit address), the highest order 48 bits of the currently executing instruction are concatenated with the 16-bit branch destination address described above.

Where seven or eight branches are specified, an additional 9-bit address extender field 805 is available in parcel 310 for specifying the destination address. This 9-bit field is concatenated with the 16-bit address described above to form a 25-bit branch destination address. In this case, complete 64-bit virtual address is formed by concatenating the highest order 39 bits of the currently executing instruction with the 25-bit branch destination address.

Additional branching flexibility is possible by stealing two of the branch addresses and assigning them permanently to special registers. A value of '1111111' in address field 802 is interpreted to mean the address specified by the value in the link register, while a value of '1111110' in address field 802 means the address specified by the value in the count register. Both of these are special purpose registers (not shown) in the processor.

Specifying the Conditional Execution of ALU Instructions

In order to improve performance with a VLIW processor, it is expected that ALU operations will be performed in parallel with the evaluation of branch conditions. However, some of the ALU operations should logically be performed only in the event that a particular branch is taken, or not taken. This is accomplished by allowing the ALU to perform the operation specified for it in all cases, but permitting the results to be stored in a target register or storage location only if the appropriate branch conditions are satisfied.

Figure 9B:
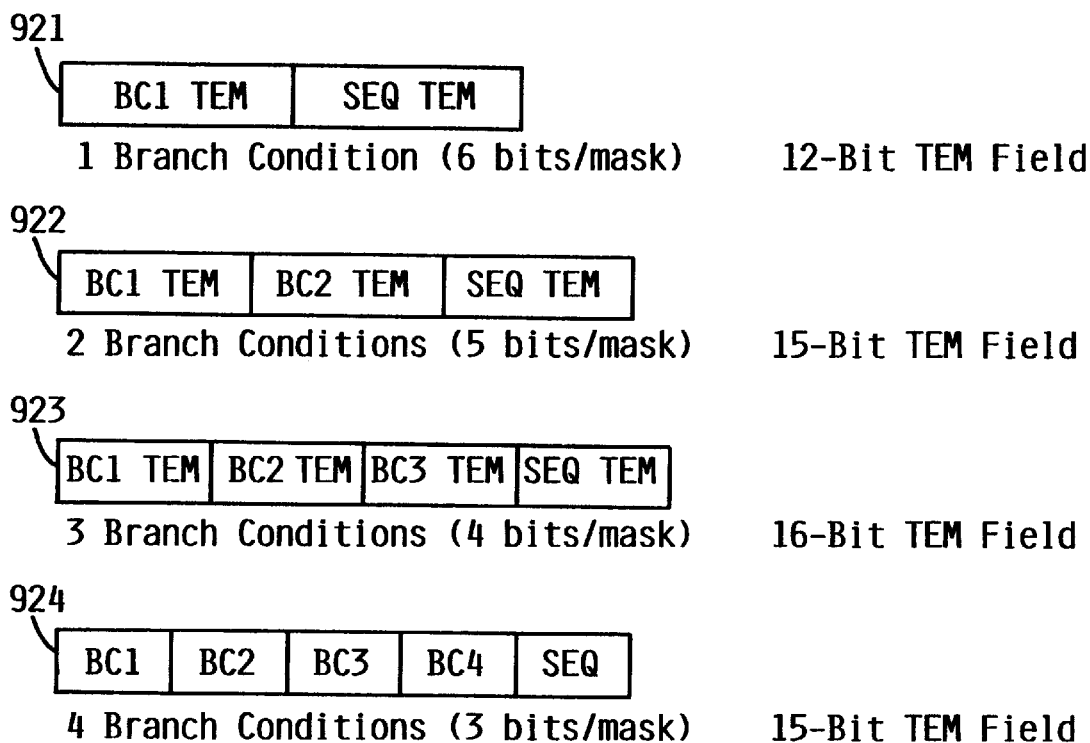

In order do this, a respective target enable mask (TEM) is associated with each possible branch condition. A separate TEM is associated with the sequential condition (SEQ TEM), i.e. the circumstance that none of the conditional branches is taken. FIGS. 9A and 9B illustrate the TEMs required for differing numbers of conditional branches in the instruction.

The TEM contains one bit for each ALU operation in the instruction. If the bit is '1', the ALU operation is to be performed whenever the associated branch condition is taken; if the bit is '0', the ALU operation is to be inhibited when the associated branch condition is taken. It will be noted that each TEM will therefore vary in size, depending on the number of ALU operations in the instruction. Since one TEM is required for each branch condition, plus an additional one for the sequential condition, the number of TEMs will also vary.

FIG. 9A shows the number of required bits where a 16-parcel instruction is used. As shown in FIG. 9A, if one branch condition is specified, two parcels (310 and 311) will be required to specify branch conditions, as explained previously. This leaves fourteen parcels available for specifying ALU operations, and therefore each TEM requires 14 bits. Two TEMs are required, one for the branch condition (BC1) and one for the sequential condition (SEQ). A total of 28 bits are needed for TEMs.

If, however, four branch conditions are specified, five parcels (310–314) will be required for specifying the branch conditions, leaving only eleven parcels available for ALU operations. Therefore each TEM requires 11 bits, but in this case five TEMs are required, one for each branch condition (BC1, BC2, BC3, BC4) and one for the sequential condition. The total number of bits needed for TEMs in this case is 55.

FIG. 9B shows the number of required bits where an 8-parcel instruction is used. In this case, the TEMs are much smaller because a much more limited number of operations and/or branches can be performed.

FIGS. 10A through 10H summarize the placement of address fields, branch condition fields and TEMs within the instruction parcels, under differing numbers of branch conditions. As will be observed, each branch condition field is stored as a contiguous 24-bit field within a single parcel. However, the TEMs are distributed among available bit space in various parcels. A single TEM therefore will not necessarily occupy contiguous bit positions. FIGS. 10A through 10H are examples using 16-parcel instructions; where an 8-parcel instruction is used, the same layout is generally possible, but fewer bits are required for the TEMs. The extra bits could be used, e.g., as additional branch address bits, similar to the example of FIGS. 10G and 10H. Where an 8-parcel instruction is used, it is possible to specify no more than four branch conditions.

In all cases where a branch condition is specified, address field 802 occupies bit positions 1 through 7 of first parcel 310. The first branch condition field (BC1) occupies bit positions 1 through 24 of second parcel 311. In all cases where at least two branch conditions are specified, the second branch condition field (BC2) occupies bit positions 1 through 24 of third parcel 312. In all cases where three or more branch conditions are specified, each branch condition field above the second (BC3, BC4 BC7) occupy bit positions 1 through 24 of the respective parcels 313–317, except that the eighth branch condition (BC8) occupies bit positions 0 through 23 of parcel 318.

Figure 10A:
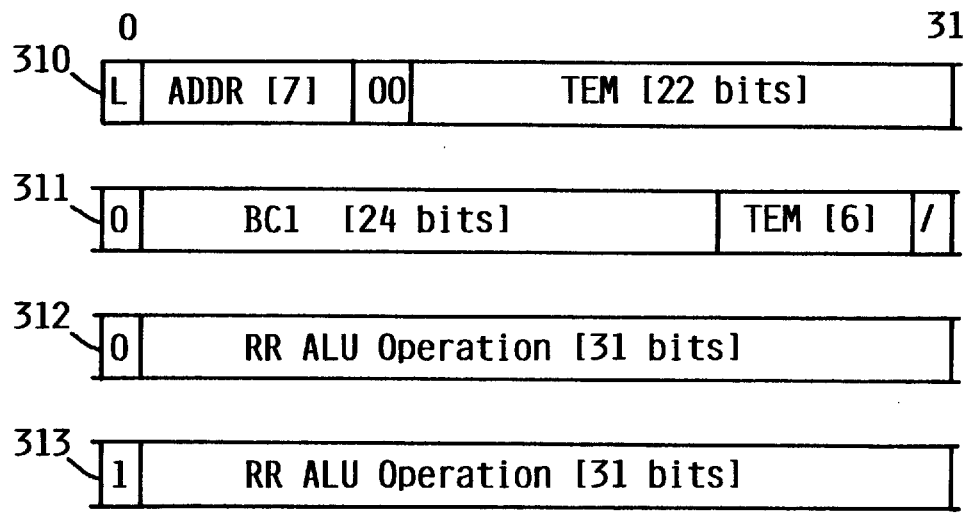

FIG. 10A illustrates the usage of bit positions in the instruction parcels in the case of a single branch condition. In this case, 28-bit TEM field 901 occupies bit positions 10 through 31 of first parcel 310, and bit positions 25 through 30 of second parcel 311. Bit positions 8 and 9 of first parcel 310, as well as bit positions 0 of second through fourth parcels 311–313, designate the number of branch conditions, as described above and shown in FIG. 7. Bit position 31 of second parcel 311 is unused. All parcels other than the first two parcels are available for ALU operations. Third and fourth parcels 312,313 specify separate ALU operations, each having an opcode beginning with '0'. This is the 0 bit position of parcels 312,313, which in fact stores a '1' in the case of parcel 313 in the example of FIG. 10A. However, because this particular parcel can only specify ALU operations beginning with '0', the bit in position 0 is ignored by instruction decode logic, and treated as a '0' for purposes of interpreting the op code.

Figure 10B:
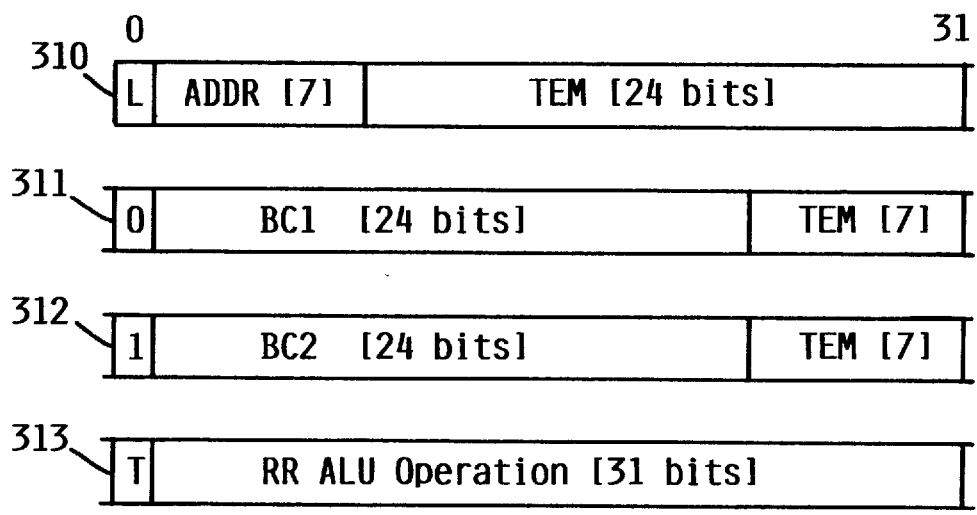

FIG. 10B illustrates the usage of bit positions when two branches are specified. In this case, 39-bit TEM field 902 occupies bit positions 8 through 31 of first parcel 310, bit positions 25 through 31 of second and third parcels 311,312, and bit position 0 of fourth parcel 313. All parcels other than the first three are available for ALU operations.

Figure 10C:
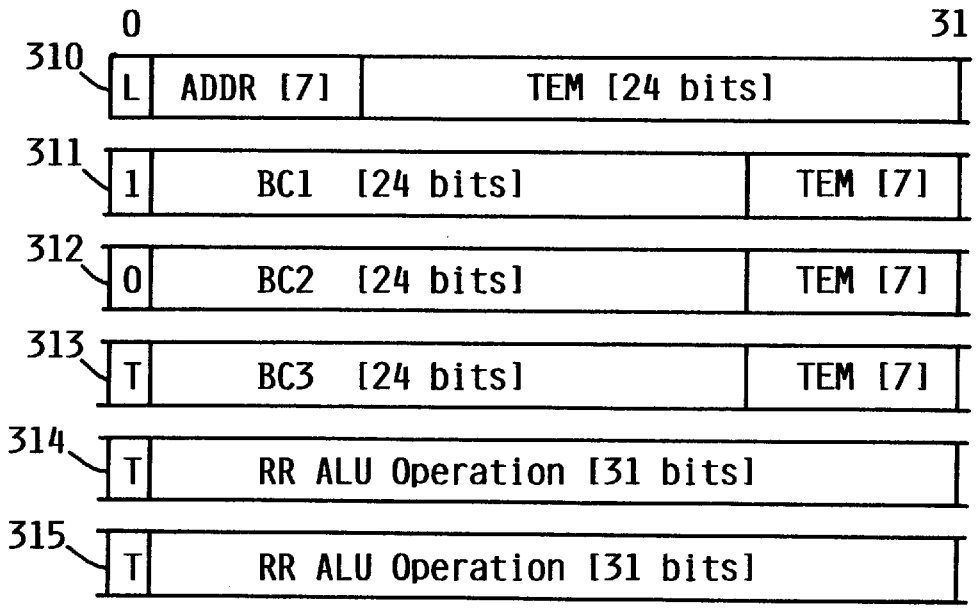

FIG. 10C illustrates the usage of bit positions when three branches are specified. In this case, 48-bit TEM field 903 occupies bit positions 8 through 31 of first parcel 310, bit positions 25 through 31 of second and third parcels 311,312, bit positions 0 and 25 through 31 of fourth parcel 313, and bit position 0 of fifth and sixth parcels 314,315; these latter two parcels specifying register-to-register ALU operations with op codes beginning in '0', as explained above.

Figure 10D:
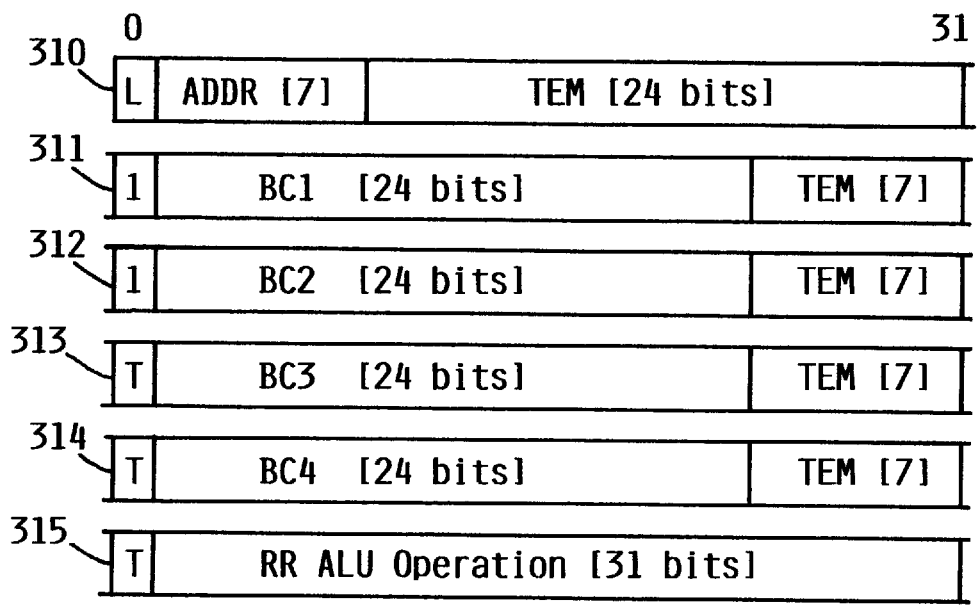

FIG. 10D illustrates the usage of bit positions when four branches are specified. In this case, 55-bit TEM field 904 occupies bit positions 8 through 31 of first parcel 310, bit positions 25 through 31 of second and third parcels 311,312, bit positions 0 and 25 through 31 of fourth and fifth parcels 313, 314, and bit position 0 of sixth parcel 315, the latter parcel specifying an RR ALU operation.

In the cases illustrated in FIGS. 10C and 10D, it would alternatively be possible to steal one or two bits of address field 802 for the TEM, thus obviating the need to put these bits in the first bit positions of parcels 314 or 315. This would allow the compiler to specify the use of any RR primitive operation in these parcels, instead of only operations having op codes beginning with '0'. However, it would reduce the available range of branch addresses than could be specified by the address field 802.

FIG. 10E illustrates the usage of bit positions when five branches are specified. In this case, 60-bit TEM field 905 occupies bit positions 9 through 31 of first parcel 310, bit positions 25 through 31 of second through fourth parcels 311–313, and bit positions 0 and 25 through 31 of fifth and sixth parcels 314,315. As in the case of a single branch condition (FIG. 10A), bit position 8 of first parcel 310 is used to designate the number of branch conditions specified.

FIG. 10F illustrates the usage of bit positions when six branches are specified. In this case, 63-bit TEM field 906 occupies bit positions 12 through 31 of first parcel 310, bit positions 25 through 31 of second through fourth parcels 311–313, bit positions 0 and 25 through 31 of fifth and sixth parcels 313–315, and bit positions 0 and 25 through 29 of seventh parcel 316. Bit positions 30 and 31 of seventh parcel 316 are unused. Four bits in the first parcel (bit positions 8 through 11) are used to designate the number of branch conditions, as shown in FIG. 7 as case 707.

Figure 10G:
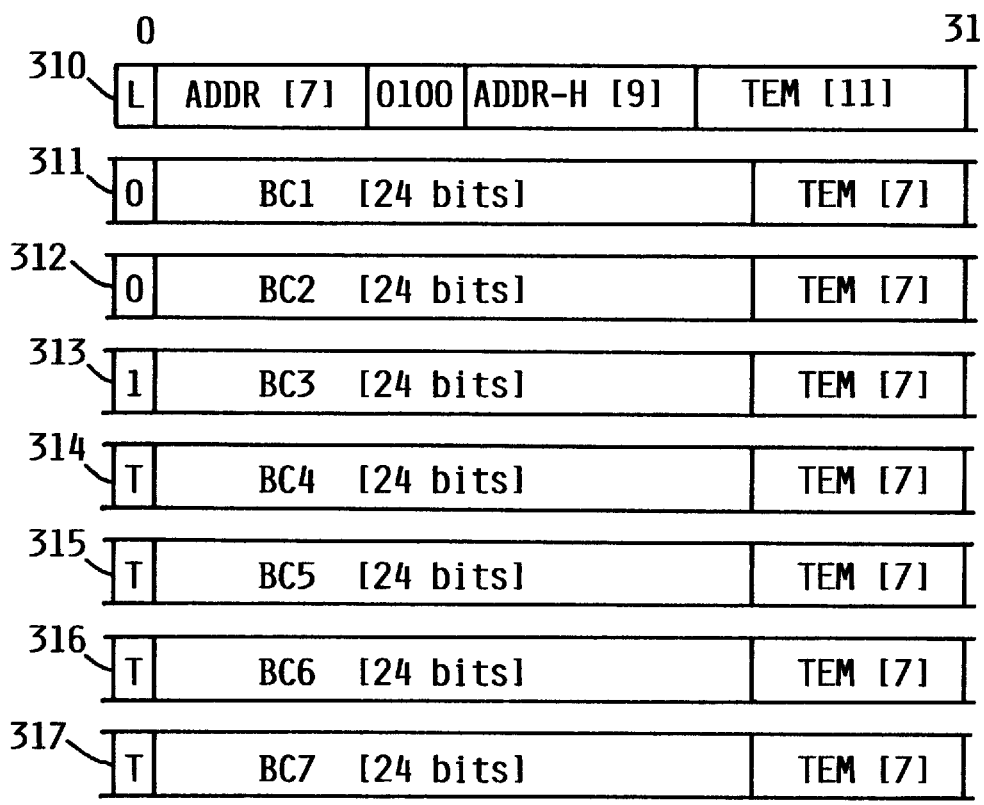

FIG. 10G illustrates the usage of bit positions when seven branches are specified. In this case, 64-bit TEM field 907 occupies bit positions 21 through 31 of first parcel 310, bit positions 25 through 31 of second through fourth parcels 311–313, and bit positions 0 and 25 through 31 of fifth through eighth parcels 314–317. In first parcel 310 an additional 9 bits are used for branch address extender field 805 at bit positions 12 through 20.

Figure 10H:
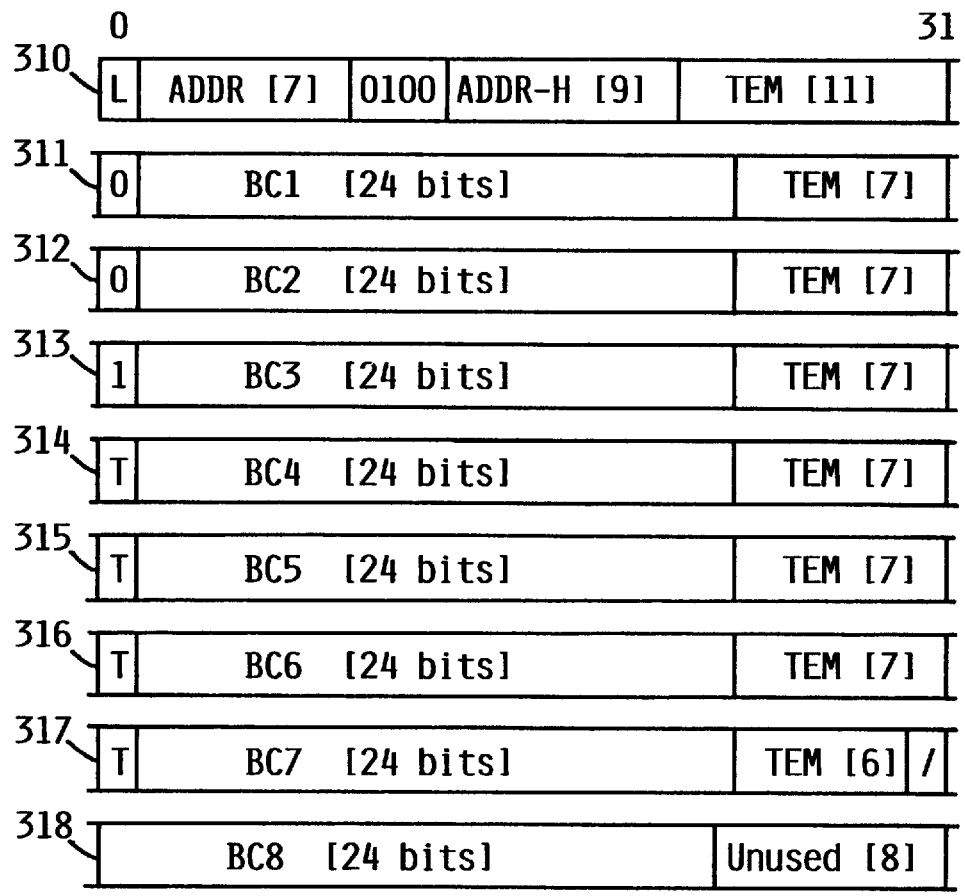

FIG. 10H illustrates the usage of bit positions when eight branches are specified. The usage is similar to the seven branch case, with the addition of another parcel 318 having some unused bit positions.

Several variations of the branch encoding scheme described above are possible. As described, when no branch is taken, program execution continues to the next consecutive address on a 64-byte boundary (each instruction being 64 bytes). However, it would also be possible to specify a destination address in the instruction for the case where no branch is actually taken. This gives the compiler greater flexibility when arranging instructions. Preferably, this would be an address derived from address field 802 as described above. The case of no branch could have an offset field 803 value of '000', for example, the first branch a value of '001', etc. This would limit the number of possible branch conditions to seven rather than eight, but since the eighth condition is rarely used, such a limitation would not significantly impact performance. The eight branch condition circumstance of FIG. 10H would simply not be used.

Another variation would be to eliminate the sequential condition, i.e., require that the instructions be coded so that one branch is always taken. The potential advantage of this approach is that the processor need not wait until all branch conditions are evaluated to determine that the sequential condition is taken. It may therefore achieve a small improvement in processor speed, depending on hardware design. It would also reduce the size of TEM fields 901–908 (because the SEQ TEM is not necessary), freeing up additional bits that could be used to increase the size of address field 802, further increasing compiler flexibility. One the other hand, one additional parcel would be required for specifying branch conditions, and the total number of branch conditions would be limited to seven (not including the default, or sequential, condition). Although the hardware of the preferred embodiment takes the next sequential instruction if no branch is taken, it should be understood that the compiler could always be constructed to force at least one branch to always be taken, e.g., by allowing the last branch condition to always evaluate to true.

Instruction Decode Hardware

Figure 11:
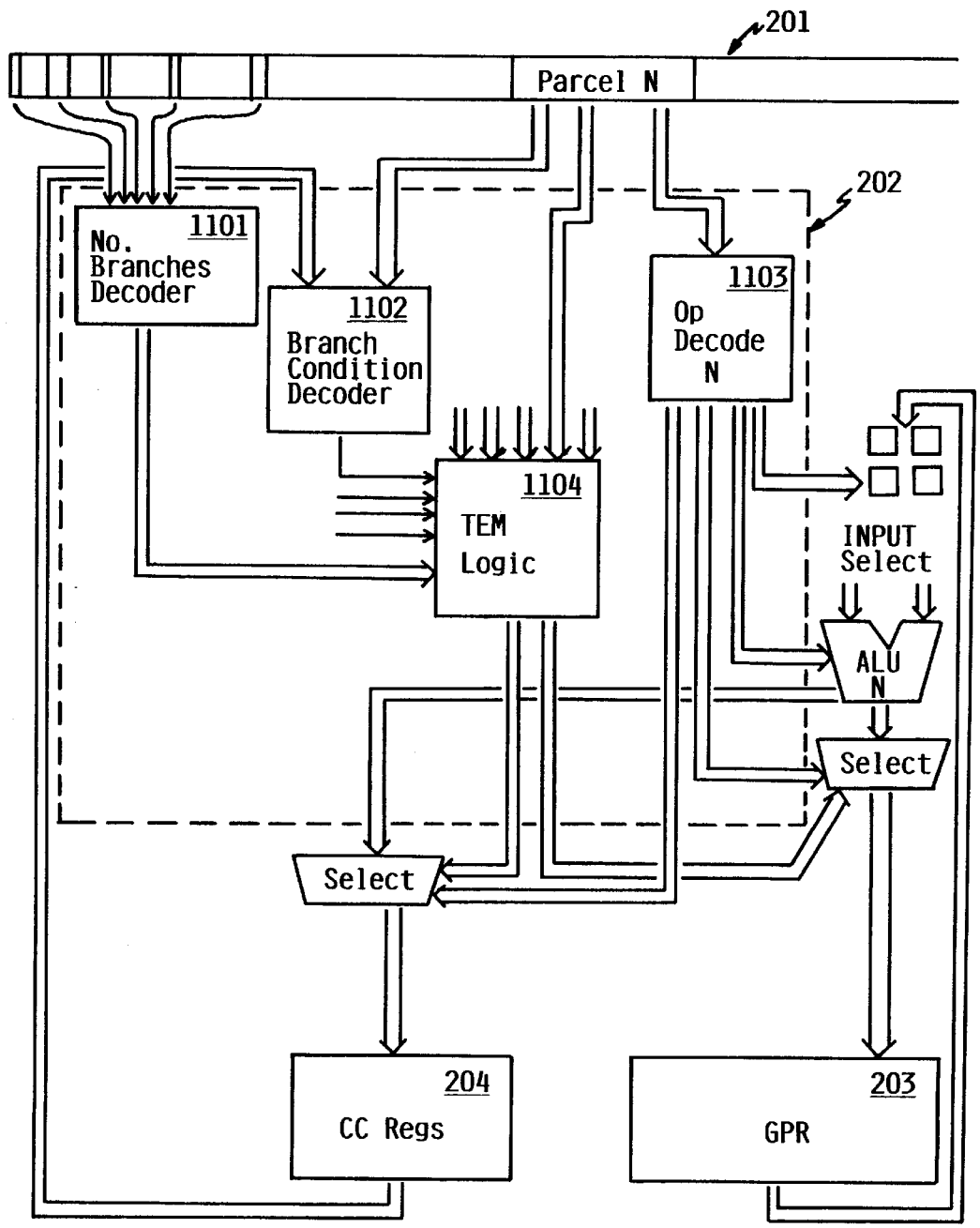
FIG. 11 depicts in greater detail certain features of the instruction decode and sequencer logic within the central processing unit, according to the preferred embodiment.

FIG. 11 shows in greater detail certain features of instruction decode and sequencer logic 202 of processor 101. FIG. 11 shows the major logic components required to decode a single parcel N, some of these components being repeated for each parcel, as described more fully below. It should be understood that certain features contained in logic 202 have been omitted for clarity. For example, logic required to determine the next instruction address has been omitted.

Number of branches decode logic section 1101 accepts as input bits 0 of parcels 310–313, and bits 8–11 of parcel 310, to determine the number of branch conditions contained in the current instruction, as described above and illustrated in FIG. 7. The output of section 1101 controls the output of masks by TEM logic section 1104, as described more fully below.

Branch condition decode logic section 1102 accepts as input the contents of condition code registers 204 and a 24-bit portion of parcel N to determine whether the branch condition specified in the 24-bit portion of parcel N is satisfied by the current contents of condition code registers 204. Control logic 202 contains one branch condition decode logic section 1102 for each parcel N which may contain a 24-bit branch condition, i.e., for each of parcels 311–318. For parcels 310 and 319–325, logic section 1102 is omitted, since these parcels can not contain a branch condition. Logic section 1102 evaluates to a boolean value indicating whether or not the branch condition is true. This boolean value is input to TEM logic section 1104.

Operation decode logic section 1103 decodes the bits of parcel N to determine the type of operation to be performed, sources and targets for data, and other parameters. Although the instruction formats are essentially the same for all parcels, a separate decode logic section 1103 exists for each parcel so that decodes can be performed in parallel. Additionally, as described above, certain parameters are implied by the ordinal position of the parcel, which logic section 1103 must take into account. The output of logic section 1103 is used to control various gates and latches into source and destination busses, registers, etc., and to control the ALU itself.

TEM logic section 1104 determines which ALU outputs are to be enabled to input data to target registers. There is one TEM logic section 1104 in control logic 202. It accepts as input the various TEM bits from each of the parcels (in most cases, 8 bits from each parcel). It also accepts the output of branch condition decode section 1102, indicating whether a particular branch condition is met, and the output of number of branches section 1101. TEM logic section 1104 uses the output of number of branches section 1101 to determine which inputs from branch condition decode section 1102 can be ignored, which parcel bits constitute the TEM field, and the formatting of individual TEMS within the TEM field. It uses the outputs of branch condition decode 1102 to select the appropriate TEM, and outputs a plurality of mask lines to inhibit or enable the outputs of the ALUs.

It will be observed that branch condition logic section 1102 and operation decode logic section 1103 perform their respective logical operations in parallel without reference to the results of decode section 1101. In the case of certain parcels, two separate logic decode paths exist in parallel, only one of which will produce a usable result, depending on the number of branch conditions. ALU operations are performed on the assumption that parcel N specifies an ALU operation, even though it may in fact specify a branch condition. The output of TEM logic section 1104 effectively masks the target of the operation if a branch condition was in fact specified. The output of TEM logic section 1104 will also mask the target of ALU N if an ALU operation is specified in parcel N, but other parcels specified one or more branch conditions and the target enable mask for the applicable branch or sequential condition specified that the result of parcel N not be used.

Figure 12:
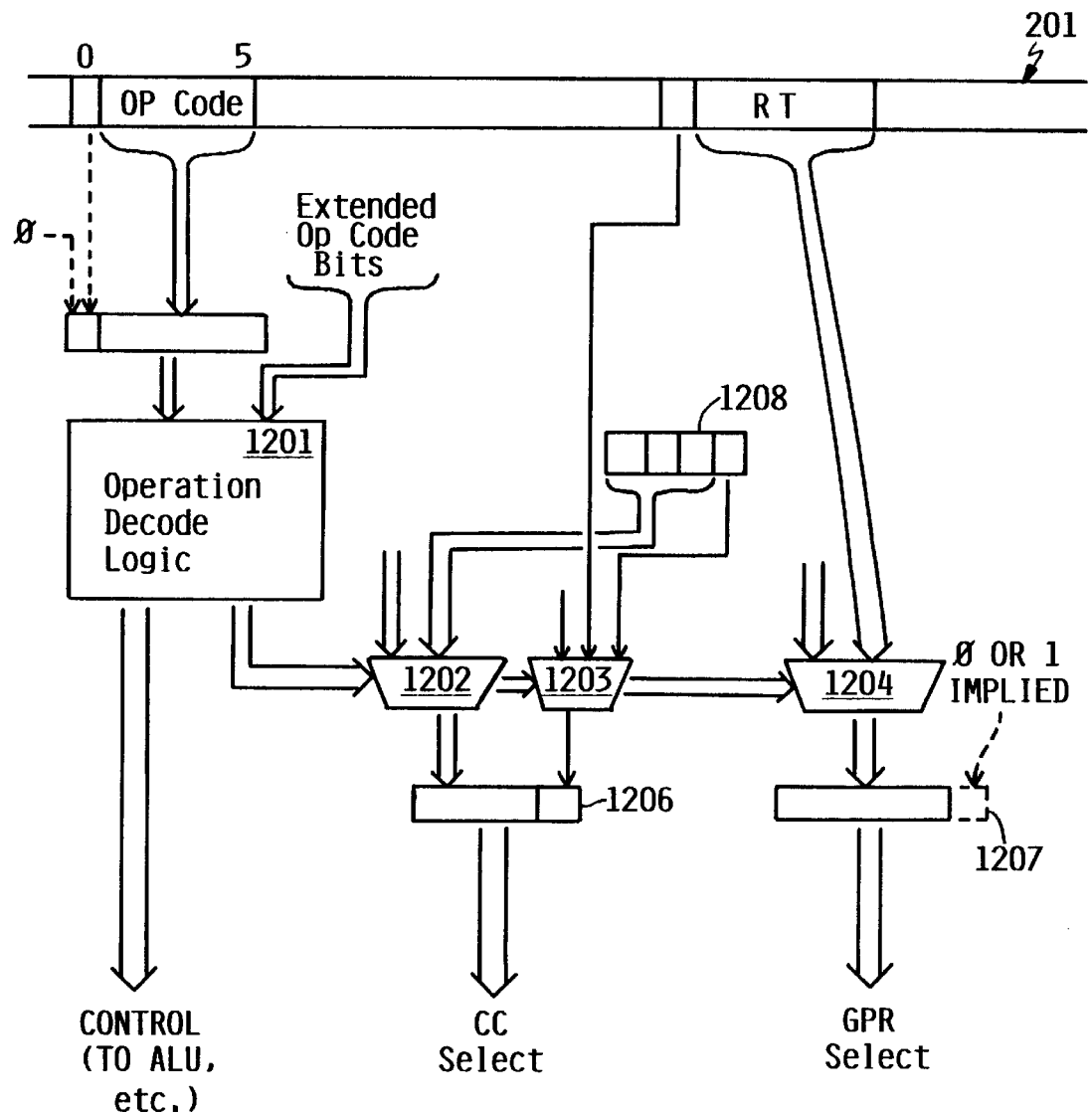
FIG. 12 shows in greater detail certain features of the operation decode logic needed to decode an instruction primitive and specify certain registers, according to the preferred embodiment.

FIG. 12 shows in greater detail certain features of operation decode logic section 1103, it being understood that FIG. 12 is not a complete depiction of all logic required to decode a primitive operation contained in a parcel in instruction register 201. Op code logic section 1201 receives the primary and extended op code bits as input. In the case of parcels 310–315, a '0' is concatenated with bits 1 through 5 of the parcel to create a 6-bit primary op code. In the case of parcels 316–325, the 6-bit primary op code is taken from bits 0 through 5 of the parcel. The op code will determine the format of the instruction (particularly, the placement of fields specifying various registers, data, etc.) and the operation to be performed by the ALU associated with the parcel being decoded. Op code logic 1201 accordingly outputs various control lines, which control ALU function, gating of certain bits in instruction register 201 to particular destinations, etc. Particularly, op code logic 1201 outputs control lines to selectors 1202–1204 which select inputs to 4-bit condition register select register 1206 and 5-bit GPR target select register 1207. The sixth bit of the GPR address is implied by the parcel position. This bit is shown conceptually in dotted lines in FIG. 12, but it does not physically exist in the register. I.e., 5-bit GPR target select register 1207 for any one parcel is capable of addressing only half of the available general purpose registers, either the even numbered registers or the odd numbered registers. Feature 1208 contains the ordinal number of the parcel. This is shown conceptually as a register, and may be implemented simply by permanently connecting certain inputs to high or low voltages. As shown, the highest order three bit positions of parcel number 1208 are input to selector 1202. Depending on the format of the operation specified by the op code, logic 1201 will direct selector 1202 to select as input to register 1206 the highest order three bits of parcel number 1208, or bits from some field in the parcel of instruction register 201. At the same time, logic 1201 will direct selector 1203 to select as input to the lowest order bit of register 1206 either the lowest order of parcel number 1208, a 1-bit condition register select field in the parcel of instruction register 201, or some other bit from the parcel. The four bits thus formed in register 1206 select one of the sixteen condition code registers 204 for receiving the condition results of the operation to be performed by the ALU corresponding to the parcel. Similarly, logic 1201 directs selector 1204 to select an appropriate 5-bit field from the parcel as the input to register 1207 (i.e., the five highest order address bits of the target general purpose register.

Examples of Alternative Embodiments

In the preferred embodiment as shown in FIG. 1, a single CPU having multiple ALUs executes instructions to perform useful work. However, it would alternatively be possible to construct a system having multiple CPUs of the type described herein, each executing instructions as herein described. Such a system would typically share main memory and certain busses, but may have separate caches and other components to support each CPU.

In the preferred embodiment, the instruction register contains 16 parcels of equal length, each parcel occupying 32 contiguous bit positions in the register. However, it should be understood that numerous alternative designs are possible. For example, it is not necessary that all parcels in the instruction register be of equal length. Nor is it necessary that each parcel occupy contiguous bit positions; it may be desirable in some implementations to interleave parcels. Furthermore, it should be noted that the instruction register may contain additional information not contained in any parcel corresponding to an ALU. Certain bit positions in the instruction register may be assigned to global control bits for controlling branching or other functions. For example, the hardware design of the preferred embodiment could be modified by removing the two ALUs corresponding to parcels RR0 and RR1. This would reduce the amount of hardware required, and in many cases these two ALUs are idle most of the time because the associated parcels contain conditional branch information.

It will further be observed that the concept of parcel affinity as explained herein facilitates scaling of the processor to even larger numbers of ALUs and parcels. For example, if a 32-parcel VLIW processor were constructed, the number of general purpose registers could be doubled to 128, without changing the size of the target register field required to specify a general purpose register. In this case, the general purpose registers would be divided into four equal groups, and each parcel would be associated with one of the groups. In effect, two bits of target register identifier would be implied by the parcel position.

As used herein, "Very Long Instruction Word" or "VLIW" is used to describe an approach to the design of a computer system, and particularly its processor. Because VLIW instructions specify multiple operations, they are typically longer than machine level instructions of a conventional Complex Instruction Set Computer (CISC) or Reduced Instruction Set Computer (RISC) processor. However, the use of the term "VLIW" to describe certain embodiments is not meant to imply that instruction words of any particular length are required. Additionally, the techniques described herein are also applicable to superscalar RISC implementations.

Although a specific embodiment of the invention has been disclosed along with certain alternatives, it will be recognized by those skilled in the art that additional variations in form and detail may be made. In particular, it will be understood by those skilled in the art that the length of certain fields, assignment of operation codes, assignment of bit positions, etc., are matters of design choice. An embodiment with certain variations has been described above, but it will be recognized that many variations are possible within the scope of the following claims.

What is claimed is:

1. A processing apparatus for digital computing, comprising:

an instruction register for storing an instruction containing a plurality of parcels, said instruction register storing said plurality of parcels at pre-defined positions;

an instruction sequencer;

a plurality of data registers;

a plurality of arithmetic logic units, each arithmetic logic unit corresponding to a respective one of said plurality of parcels;

instruction decode logic for decoding digital data contained within each parcel to determine the operation to be performed by the respective arithmetic logic unit corresponding to the parcel, wherein, for at least some of said parcels, said instruction decode logic combines at least one bit of digital data not contained in the parcel with the digital data contained in the parcel to determine the operation to be performed, said digital data not contained in the parcel being derived from the pre-defined position of the parcel.

2. The processing apparatus of claim 1, wherein said instruction may specify a variable number of branch conditions.

3. The processing apparatus of claim 2, wherein said instruction decode logic alternatively interprets information contained within at least one parcel to specify an operation to be performed by the arithmetic logic unit associated with said parcel or to specify branch information.

4. The processing apparatus of claim 3, wherein operation codes within a parcel are specified at a pre-defined operation code field having m bits;

wherein at least one of said arithmetic logic units is capable of performing only a subset of operations which can be specified with an operation code, said subset being fewer than all the operations which can be specified by said operation code, the operations codes within said subset being specified by a pre-defined number of bits n, said pre-defined number of bits n being fewer than m; and wherein at least one bit of a parcel associated with said at least one arithmetic logic unit which is capable of performing only a subset of operations which can be specified with an operation code is used by said instruction decode logic to determine whether to interpret information contained within at least one parcel to specify an operation to be performed by an arithmetic logic unit or to specify branch information.

5. The processing apparatus of claim 3, wherein all said parcels are of equal size, said instruction consisting of a plurality of said parcels and having a length equal to a multiple of said parcels.

6. The processing apparatus of claim 1, wherein all said parcels are of equal size, said instruction consisting of a plurality of said parcels and having a length equal to a multiple of said parcels.

7. The processing apparatus of claim 6, wherein at least one pre-defined bit position of said instruction specifies said instruction length, said instruction length being a multiple of said parcels.

8. The processing apparatus of claim 1, wherein said at least one bit of digital data not contained in the parcel is used to determine which of said plurality of data registers is to be used in the operation to be performed.

9. The processing apparatus of claim 1, wherein said at least one bit of digital data not contained in the parcel is used to determine an operation code for the type of operation to be performed by the arithmetic logic unit corresponding to the parcel.

10. The processing apparatus of claim 1, wherein at least one pre-defined bit position of said instruction specifies an instruction length.

11. A digital computing apparatus, comprising:

a processor for executing instructions, each instruction being divisible into a plurality of parcels, each parcel having a position within said instruction and specifying an operation;

a random access memory for storing data, including said instructions;

at least one input/output device for input or output of data;

at least one bus enabling said processor to communicate with said random access memory and said at least one input/output device;

wherein said processor comprises:

an instruction register for storing an instruction to be executed by said processor, each parcel of an instruction being stored at a respective pre-defined position;

an instruction sequencer;

a plurality of data registers;

a plurality of arithmetic logic units, each arithmetic logic unit corresponding to a respective one of said pre-defined positions of said plurality of parcels in said instruction register;

instruction decode logic for decoding digital data contained within each parcel to determine the operation to be performed by the respective arithmetic logic unit corresponding to the parcel, wherein, for at least some of said parcels, said instruction decode logic combines at least one bit of digital data not contained in the parcel with the digital data contained in the parcel to determine the operation to be performed, said digital data not contained in the parcel being derived from the pre-defined position of the parcel.

12. The digital computing apparatus of claim 11, further comprising:

an instruction cache for temporarily storing a plurality of instructions contained in said random access memory for execution by said processor; and a data cache separate from said instruction cache for temporarily storing data contained in said random access memory for use by said processor.

13. The digital computing apparatus of claim 11, wherein said at least one bit of digital data not contained in the parcel is used to determine which of said plurality of data registers is to be used in the operation to be performed.

14. The digital computing apparatus of claim 11, wherein said at least one bit of digital data not contained in the parcel is used to determine an operation code for the type of operation to be performed by the arithmetic logic unit corresponding to the parcel.

15. The digital computing apparatus of claim 11, wherein at least one pre-defined bit position of said instruction specifies an instruction length, said instruction length being a multiple of said parcels.

* * * * *